(12) United States Patent
Kearney et al.

(10) Patent No.: US 11,500,464 B2
(45) Date of Patent: *Nov. 15, 2022

(54) HAPTIC INTERFACE DEVICES

(71) Applicant: VRgluv LLC, Atlanta, GA (US)

(72) Inventors: Derek Kearney, Atlanta, GA (US); Christopher Taylor, Atlanta, GA (US); Addison Shelton, Atlanta, GA (US); Harold Brown, Atlanta, GA (US)

(73) Assignee: VRgluv LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,347

(22) Filed: Jun. 29, 2020

(65) Prior Publication Data

US 2020/0326780 A1    Oct. 15, 2020

Related U.S. Application Data

(63) Continuation of application No. 15/943,667, filed on Apr. 2, 2018, now Pat. No. 10,698,488.

(Continued)

(51) Int. Cl.
*G08B 6/00* (2006.01)
*G06F 3/01* (2006.01)
(Continued)

(52) U.S. Cl.
CPC .............. *G06F 3/016* (2013.01); *G06F 3/011* (2013.01); *G06F 3/014* (2013.01);
(Continued)

(58) Field of Classification Search
CPC ......... G06F 3/016; G06F 3/014; A41D 19/00; A41D 1/005; B25J 13/02; B25J 13/085;
(Continued)

(56) References Cited

U.S. PATENT DOCUMENTS 6,995,744 B1 *  2/2006  Moore ............... G06F 3/016
                                                         345/157
8,570,273 B1   10/2013  Smith
(Continued)

FOREIGN PATENT DOCUMENTS

WO    2018184032 A1    10/2018

OTHER PUBLICATIONS

International Search Report and Written Opinion dated Jun. 27, 2018 cited in Application No. PCT/US18/25772, 12 pgs.

(Continued)

*Primary Examiner* — Daniel Previl
(74) *Attorney, Agent, or Firm* — Bekiares Eliezer LLP

(57) ABSTRACT

Disclosed herein are interface devices and systems. In one aspect, a haptic interface device includes at least one position detection module configured to determine positional data for determining a position of at least one portion of at least one body part of the user; at least one tensile element or compressive element coupled to the at least one body part and configured to produce at least one of: a predetermined range of motion and applied force to a coupled body part; and at least one haptic feedback module configured to produce force feedback or tactile sensation to the at least one body part, the feedback module comprising: at least one motion control module configured to control motion of the at least one body part; and at least one force sensor configured to determine applied force data generated from the at least one body part. Also disclosed herein are methods for using the disclosed devices and systems.

21 Claims, 9 Drawing Sheets

Related U.S. Application Data

(60) Provisional application No. 62/523,779, filed on Jun. 23, 2017, provisional application No. 62/479,428, filed on Mar. 31, 2017.

(51) Int. Cl.
  *G06F 3/04815* (2022.01)
  *G06F 3/04842* (2022.01)
  *G02B 27/01* (2006.01)

(52) U.S. Cl.
  CPC ...... *G06F 3/04815* (2013.01); *G06F 3/04842* (2013.01); *G02B 27/017* (2013.01)

(58) Field of Classification Search
  CPC ........ B25J 15/0009; B25J 3/04; B25J 9/0006; G06T 19/006; G08B 6/00
  USPC ....... 340/435, 850, 853.1, 870.01, 901, 906, 340/907, 932.2, 933, 944, 945, 984, 988, 340/425.5, 146.2, 500, 1.1, 286.01, 425.1, 340/407.1, 815.4, 384.1, 999, FOR. 000, 340/FOR. 311, FOR. 415, FOR. 465, 991, 340/994, 995.12, 502–503, 533, 539.12, 340/539.1, 636.17, 683, 5.6, 5.82
  See application file for complete search history.

(56) References Cited

U.S. PATENT DOCUMENTS

| | | | |
|---|---|---|---|
| 10,698,488 B2* | 6/2020 | Kearney | G06F 3/014 |
| 2001/0043847 A1 | 11/2001 | Kramer | |
| 2004/0095311 A1* | 5/2004 | Tarlton | G06F 3/016 |
| | | | 345/156 |
| 2007/0091063 A1 | 4/2007 | Nakamura et al. | |
| 2013/0278500 A1* | 10/2013 | Kawasaki | B25J 13/02 |
| | | | 345/156 |
| 2016/0259417 A1* | 9/2016 | Gu | G06F 3/014 |
| 2017/0097680 A1 | 4/2017 | Keller et al. | |
| 2017/0173262 A1* | 6/2017 | Veltz | A61B 5/0022 |
| 2017/0319905 A1* | 11/2017 | O'Connor | A63B 21/0628 |
| 2018/0077976 A1* | 3/2018 | Keller | A41D 1/005 |
| 2018/0081436 A1 | 3/2018 | Keller et al. | |
| 2018/0231393 A1 | 8/2018 | Czaja et al. | |
| 2018/0284896 A1 | 10/2018 | Kearney et al. | |

OTHER PUBLICATIONS

Extended European Search Report dated Oct. 23, 2020 cited in Application No. 18774668.0, 7 pgs.

* cited by examiner

HAPTIC INTERFACE DEVICES

RELATED APPLICATIONS

This application is a continuation of U.S. patent application Ser. No. 15/943,667, filed Apr. 2, 2018, which claims the benefit of priority to U.S. Provisional Patent Application Ser. No. 62/523,779, filed Jun. 23, 2017, and U.S. Provisional Patent Application Ser. No. 62/479,428, filed Mar. 31, 2017, which are hereby incorporated herein by reference in their entirety.

FIELD OF INVENTION

The present invention relates to haptic interface devices and systems, with applications in virtual reality (VR) and augmented reality (AR) simulations.

BACKGROUND OF THE INVENTION

Virtual reality (or VR) is a computer technology that uses software-generated realistic images, sounds and other sensations to replicate a real environment or an imaginary setting, and simulates a user's physical presence in this environment to enable the user to interact with this space. A person using virtual reality equipment is typically able to "look around" the artificial world, move about in it and interact with features or items that are depicted. Virtual realities artificially create sensory experiences, which can include sight, hearing, and, less commonly, touch. Virtual realities are displayed either on a computer monitor, a projector screen, or with a virtual reality headset (also called head-mounted display). Some simulations include additional sensory information and provide sounds through speakers or headphones.

A number of motion capture input hand device have been introduced to enhance the VR sensory experience. Existing products utilize camera and computer vision technologies such as optical capturing, IMU (inertia measurement unit) capturing and bending sensor capturing, to analyze the shape and direction of a hand. There are a number of shortcoming with each of these technologies, such as restricted camera field of views, cumbersome size or construction, and constant recalibration requirements, among other issues. Moreover, many existing devices are unable to offer native or integrated haptic feedback. Thus, there remains a need for improved interface devices that offers haptic feedback capabilities and are comfortable to wear for a user. This need and other needs are satisfied by the various aspects of the present invention.

SUMMARY OF THE INVENTION

In accordance with the purposes of the invention, as embodied and broadly described herein, the invention, in one aspect, relates to interface devices and systems, such haptic interface devices and systems for computer, virtual reality, or augmented reality systems, more specifically, interface devices configured to be worn by a user or coupled to a user's body part.

In another aspect, the invention relates to a interface device for a user, the device comprising: at least one position detection module configured to determine positional data for determining a position of at least one portion of at least one body part of the user; at least one tensile element or compressive element coupled to the at least one body part and configured to produce positional data associated with the at least one coupled body part; the at least one tensile element being in operative communication with the at least one positional detection.

In another aspect, the invention relates to a haptic interface device for a user, the device comprising: at least one position detection module configured to determine positional data for determining a position of at least one portion of at least one body part of the user; at least one tensile element or compressive element coupled to the at least one body part and configured to produce at least one of: a predetermined range of motion and applied force to a coupled body part; and at least one haptic feedback module configured to produce force feedback or tactile sensation to the at least one body part, the feedback module comprising: at least one motion control module configured to control motion of the at least one body part; and at least one force sensor configured to determine applied force data generated from the at least one body part; wherein the at least one tensile element is in operative communication with at least one of: the at least one positional detection and the at least one motor control module.

In further aspects, the invention also relates to methods for using the disclosed devices and systems, and kits comprising the devices and instructions for using the devices.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

FIG. 7 shows a diagram depicting a device in accordance with an exemplary embodiment of the present invention.

DETAILED DESCRIPTION OF THE INVENTION

Figure 1:
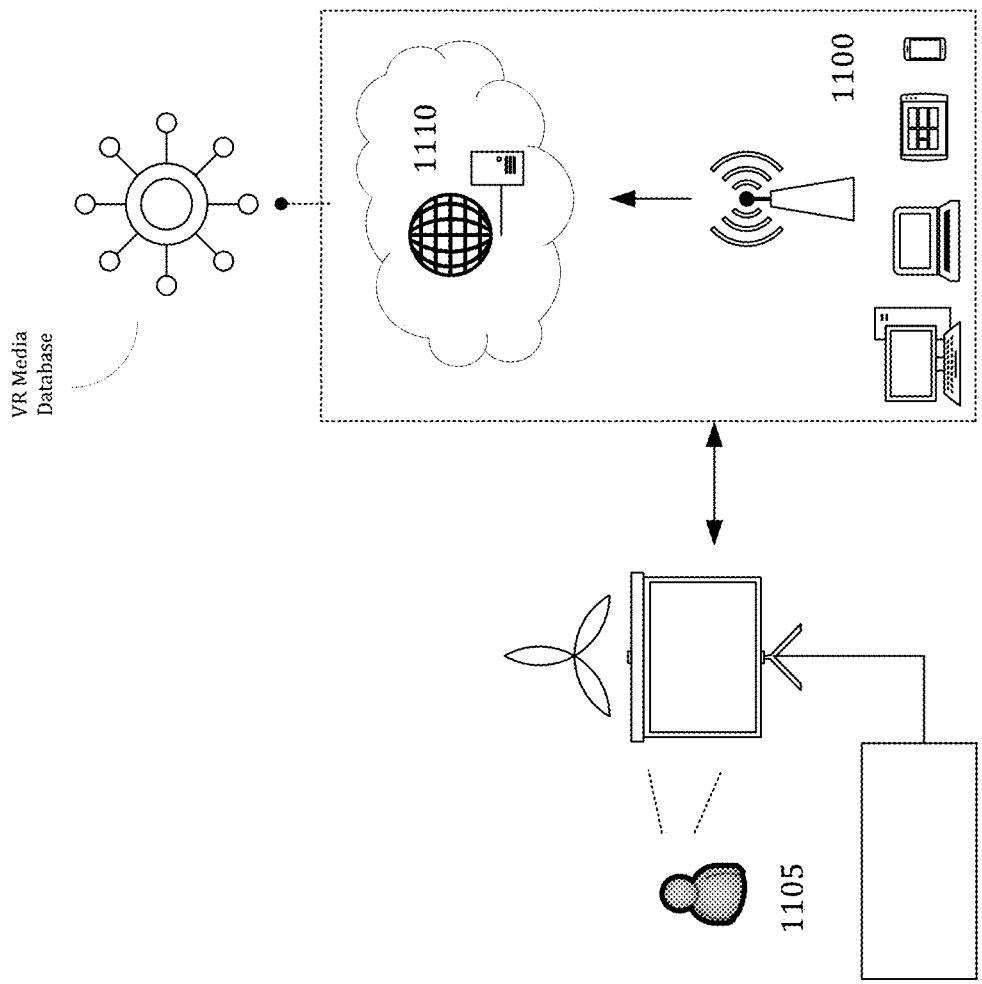
FIG. 1 shows a block diagram depicting an operating environment consistent with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a tensile element" includes two or more tensile elements.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The present disclosure includes many aspects and features. Moreover, while many aspects and features relate to, and are described in, the context of virtual reality and gloves, embodiments of the present disclosure are not limited to use only in this context. Both the overview and the detailed description provide examples and are explanatory only. Accordingly, the overview and the detailed description should not be considered to be restrictive. Further, features or variations may be provided in addition to those set forth herein. For example, embodiments may be directed to various feature combinations and sub-combinations described in the detailed description.

B. Interface Devices and Systems

As briefly described above, the present disclosure relates, in various aspects, to haptic interface devices and systems is provided. This overview is provided to introduce a selection of concepts in a simplified form that are further described below. This overview is not intended to identify key features or essential features of the claimed subject matter. Nor is this overview intended to be used to limit the claimed subject matter's scope.

In various aspects, the disclosed haptic interface devices and systems can be configured to use with and are compatible with any desired computing, virtual reality, and augmented reality system. In this aspect, various embodiments of the present disclosure may be natively compatible with a plurality of virtual reality or augmented reality headsets and are not dependent on any particular system or headset type. While the aforementioned AR and VR headsets can provide a user with the visual and audio aspect of a virtual reality world, the physical sensations corresponding to the virtual reality experience are lacking. Thus, according various aspects of the present disclosure, the disclosed haptic interface devices can provide the user with a simulation of the physical aspects of virtual reality, such as, and without limitation, various force or sensation profiles of virtual objects. By combining the visual, audio, and physical aspects of virtual reality, the user's virtual reality experience is magnified, providing an enhanced experience. In various further aspects, to use the haptic interface device, a user can put on a disclosed haptic interface device and a virtual reality headset. A video game or simulation may be played on the headset device of the user. In use, the disclosed devices can accurately track the user's hands and finger and transmit the positional data to the virtual reality headset or computing device. According to further aspects, through the use of the inventive combination of innovative elements and unique construction, (e.g., tensile elements, potentiometers, springs, motors, stopping blocks, and other sensors), the disclosed devices can track user movements (e.g., finger movements) and also provide haptic or force feedback to a couple portion of the user's body. In still further aspects, such as when the user contracts their fingers, the position detection module can communicate with the virtual reality system or computing device to determine the position of the finger in 3D space. In even further aspects, an internal stopping mechanism (e.g., motion limiting component or stop block) in a motion control module constrains forward motion of a tensile string to produce an applied force to a corresponding portion of the user's body. In yet further aspects, the disclosed devices can also sense and measure the forces applied by the user and use the applied force data to adjust the force profile to replicate the physical interaction with the virtual object sensors. In some aspects, a wireless module (e.g., wireless transmitter and/or receiver) can be built into the device and can be configured to send and receive data from integrated sensors and motors to a computing device or VR system. To this end, the haptic interface devices of the present disclosure enable the user to practically touch and intimately interact with the virtual objects.

In one aspect, FIG. 1 illustrates one possible operating environment through which a computing device, such as part of a VR system, consistent with embodiments of the present disclosure may be provided. The computing device may comprise a set of software instructions for operating with the disclosed devices. By way of non-limiting example, the computing device may be in communication with a centralized server 110, such as, for example, a cloud computing service with a media database. The media database may comprise a plurality of virtual reality simulations to be communicated with the virtual reality system.

In some embodiments, the computing device may comprise a plurality of virtual reality simulations to be streamed to a user's virtual reality headset. The virtual reality simulations may comprise metadata with instructions for interacting with the device. The metadata can comprise data for interacting or communicating with the interface device (e.g., the haptic feedback or position detection module), and may be synchronized with the video and/or audio data of the virtual reality simulations. The computing device may stream the video and/or audio data to the headset while communicating with the interface device (e.g., the haptic feedback or position detection module) based on the synchronized metadata.

In other embodiments, the movies/games may be downloaded to the headset. The computing device may then talk to the haptic interface device and communicate the material properties and/or positions of virtual objects that the interface device must respond to. To this end, the haptic interface device can be configured to provide variable force profiles or variable sensation profiles. In further aspects, the haptic interface device can be configured to simultaneously provide a plurality of variable force profiles and/or a plurality of variable sensation profiles. For example, and without limitation, the device can simultaneously deliver a first variable force profile to a user's finger and deliver a second variable force profile to a different user finger. In still further aspects, the device can be configured to provide different variable force profiles or different variable sensation profiles at any desired rate or time interval. The software application may be embodied as, for example, but not be limited to, a website, a web application, a desktop application, and a mobile application in communication with the computing device. The bi-directional communication may enable the transmission of data.

As will be detailed herein, the computing device through which the haptic interface devices may be accessed and used may comprise, but not be limited to, for example, a virtual reality headset, an augmented headset, a desktop computer, a laptop, a tablet, or mobile telecommunications device. Though various aspects of the present disclosure are written with reference to a virtual reality system, it should be understood that any computing device or system may be employed to provide the various embodiments disclosed herein.

In various aspects, the present disclosure provides a haptic interface device for a user, comprising at least one position detection module configured to determine positional data for determining a position of at least one portion of at least one body part of the user; at least one tensile element coupled to the at least one body part and configured to produce at least one of: a predetermined range of motion and applied force to a coupled body part; and at least one haptic feedback module configured to produce a tactile sensation or force feedback to the at least one body part, the force feedback module comprising: at least one motion control module configured to control a range of motion of the at least one body part; and at least one force sensor configured to determine applied force data generated from the at least one body part. In further aspects, the device may comprise a plurality of tensile elements. In still further aspects, at least one tensile element may be in operative communication with at least one of: the at least one positional detection. In some aspects, the force feedback produced may be based on at least one of: the applied force data and the positional data. In other aspects, the force feedback produced may be based on both the applied force data generated by the user and the positional data.

In various aspects, the device may comprise a plurality of sensors. The sensor may comprise at least one of: a position sensor, an angle sensor, force sensor, and torque sensor. Accordingly, the sensor may be configured to sense at least one of: position data, angle data, force data, and torque data.

In further aspects, the device may comprise a plurality of position detection modules. In still further aspects, the position detection module may comprise at least one position sensor. In yet further aspects, the position detection module may comprise a plurality of position sensors. In even further aspects, the position detection module may be configured to determine positional data based at least on a linear displacement of the tensile element. In still further aspects, the position detection module may be configured to determine positional data based at least on measuring tensile element stroke length caused by at least one of: movement of the at least one body part and articulation of the at least one body part.

In various aspects, the position detection module may be configured to measure at least one of: linear motion data and rotational motion data. For example, in further aspects, the position detection module may be configured to spool or wind a portion of the tensile element, such as, and with limitation, by using a cylinder element. In still further aspects, the position detection module may comprise one or more cylinder elements on which at least a portion of the tensile element can be wound and unwound. In yet further aspects, the position detection module can be configured to determine positional data based at least on rotational motion data generated by a cylinder element. In even further aspects, the cylinder element may comprise at least one of a flanged cylinder, unflanged cylinder, drum, spool, wheel, reel, spindle, bobbin, pulley, shaft, and spinner.

In further aspects, the position sensor may be configured to measure rotational motion data from the cylinder element for a plurality of axes. In still further aspects, the position detection module may be configured to determine linear displacement of the tensile element based at least on the rotational motion data and cylinder element dimensions. In yet further aspects, determining linear displacement of the tensile element may comprise mapping rotational data to a linear distance based on cylinder dimensions.

In various aspect, the position sensor can comprise at least one of: an optical encoder, hall effect sensor, magnetic encoder, current sensor, potentiometer, optical encoder, digital encoder, motor encoder, magnetic encoder, inertial measurement unit (IMU), flex sensor, and stretch sensor. In some aspects, at least one position sensor is at least one of a hall-effect sensor and 3-axis hall effect sensor. In further aspects, the position detection module may comprise a first position sensor and a second position sensor.

The device of any preceding claim, wherein the position detection module comprises a first position sensor configured to produce positional data for a first body part portion and a second position sensor configured to produce positional data for a second area of the user's body. In some aspects, at least one position sensor may be configured to produce positional data associated with at least one of lateral movement and vertical movement. In other aspects, at least one position sensor may be configured to produce positional data associated with at least one of: side to side (e.g., lateral) angle data and up and down (e.g., vertical) angle data from movement the user's body part.

In various aspects, the device may further comprise at least one retraction mechanism. In further aspects, the retraction mechanism may be in operable communication with at least one of: a tensile element and a position detection module component, such as, a cylinder element used to wind and unwind a tensile element. In still further aspects, the retraction mechanism may be configured to maintain a predetermined tension level in the tensile element. In yet further aspects, the retraction mechanism may be configured to return the tensile element to a default position in the absence of an applied force acting on the tensile element, such as, for example, an opposing force applied by a user. In even further aspects, the retraction mechanism may be configured to at least one of: return the tensile element to a default or start position in the absence of an applied force and return the position detection module to a starting configuration in the absence of an applied force. In still further aspects, the retraction mechanism may comprise at least one of a torsion spring, extension spring, constant force spring, retraction spring, power spring, elastic retractor, pulley system, compression spring, and motor. In some aspects, a tensile element and retraction mechanism may be connected using a tensile element connector or connecting means.

In various aspects, the tensile element may be configured to carry, transmit, or otherwise create an applied force to coupled portion of the user's body part. In further aspects, the tensile element may be configured to transmit or carry the tension to a portion of a user's finger to create the sensation of touch on the finger. In still further aspects, the tensile element may be configured to carry the tension to at least one finger segment to create the sensation of touch on the finger. In some aspects, a plurality of tensile elements are configured to carry the tension to a plurality of finger segments to create the sensation of touch on the finger.

In further aspects, the device may comprise first and second tensile elements. In still further aspects, the device may comprise first and second tensile elements for each user finger. In yet further aspects, the device may comprise first and second tensile elements, the first tensile element being configured to couple to a first portion of the user's body and the second tensile element being configured to couple to a second portion of the user's body. In even further aspects, the device may comprise first and second tensile elements, the first tensile element being configured to couple to a first segment of the user's finger and the second tensile element being configured to couple to a second segment of the same finger. In still further aspects, the device may comprise first and second tensile elements, the first tensile element being configured to couple to a distal segment of the user's finger and the second tensile element being configured to couple to a proximal segment of the same finger.

In further aspects, the device may further comprise a third element configured to couple to a third portion of the user's body part. In still further aspects, the third tensile element may be configured to couple to a third segment of the same finger. In yet further aspects, the third tensile element may be configured to couple to a middle segment of the same finger.

As described above and detailed further in the Figures, a tensile element may, according to various aspects, be in operable communication with at least one of: a position detection module and a motor control module. In further aspects, a tensile element may be in operable communication with both the position detection module and the motor control module. To this end, a single tensile element may be used in determining positioning data with the position detection module and the same tensile element may be used in producing force feedback with the motor control module. However, in some embodiments, a tensile element may be in operable communication with either the position detection module or the motor control module. To this end, a first tensile element may be used in determining positioning data with the position detection module and a different tensile element may be used in producing force feedback with the motor control module.

In further aspects, the tensile element may be configured to provide a travel adjustment or reduction relative to other tensile elements. For example, in still further aspects, the first tensile element may comprise at least a 2:1 step up ratio for increasing total travel length of the first tensile element relative to a stop position, and wherein the second tensile element comprises a 1:1 travel length relative to the same stop position. In yet further aspects, the travel adjustment or reduction may be at least about 2:1. In even further aspects, the tensile element may be configured to allow the tensile element to be pulled twice as far as another tensile element, for example, tensile elements that coupled to different portions of the same user body part. In still further aspects, the travel adjustment may be produced using a groove or pulley, or the like.

In further aspects, the tensile element may have a tension level of at least about 1 lb./force. In still further aspects, the tension level may be in a range from greater than 0 to about 100 lb./force. In still further aspects, the tension level may be sufficient to create the sensation of touch on the user's body part. In yet further aspects, the tensile element may further comprise at least one tensile element connector.

In various aspects, the device is further configured to derive secondary positional data and positional models based at least on at least one of: linear displacement from at least one of a plurality of tensile elements and linear length from at least one of a plurality of tensile elements. In further aspects, the device may be further configured to generate secondary positional data and positional models based at least on at least one of: linear displacement from the first and second tensile elements and linear length from the first and second tensile elements. In some aspects, generating secondary positional data and positional models may be based at least on at least one of: relative tensile element lengths, derived relationships between known positional data, and derived relationships between measured positional data. In other aspects, generating secondary positional data and positional models may be based at least on at least one of: relative tensile element lengths and derived relationships between positional data from the first and second position sensors.

In various aspects, the device may comprise at least one motion control module. In further aspects, the motion control module may comprise at least one motion position sensor. In still further aspects, the motion position sensor may comprise at least one of: an optical encoder, magnetic encoder, current sensor, potentiometer, optical encoder, digital encoder, motor encoder, magnetic encoder, inertial measurement unit (IMU), flex sensor, and stretch sensor. In some aspects, the motion position sensor may be a potentiometer. In other aspects, the motion position sensor may be a motor encoder.

In further aspects, the motion control module may comprise a stopping mechanism configured to provide a stop position for the tensile element. In still further aspects, the stopping mechanism may comprise at least one channel configured to allow the tensile element to travel through. In still further aspects, the stopping mechanism may comprise a plurality of channels configured to allow different tensile elements to travel through. In yet further aspects, the channel may comprise at least one of an opening, aperture, and tubing.

In various further aspects, the stopping mechanism may be configured to control movement of at least one body part. In still further aspects, the stopping mechanism may be configured to stop forward travel of the tensile element by preventing a tensile element connector connected to a portion of the tensile element from passing through the stopping mechanism channel. In yet further aspects, the stopping mechanism comprises at least one of a motion limiting component, stop block, lead nut, dampener, and brake. In some aspects, the stop position may comprise a forward travel limit for the tensile element. In other aspects, the travel distance between the default position and stop position may define a range of motion of the coupled body part.

In further aspects, the motion control module may comprise at least one power transmission component. In still further aspects, the power transmission component comprises at least one of: an electromechanical actuator, a motor, belt and pulley, linear actuator, screw drive, rotational motor with linkage, rack and pinion, pneumatic, electromagnetic, hydraulic, and combustion. In yet further aspects, the power transmission component may be configured to move the motion limiting component to a stop position. In some aspects, the motion control module comprises a motor, drive screw, motion limiting component, motor encoder; and force sensor. In other aspects, the motion limiting component may be attached to the drive screw.

In further aspects, the motion position sensor may be configured to generate positional data of the stop position for the stopping mechanism. In still further aspects, the device may be configured to convert rotational motion from the power transmission component into linear motion for the motion limiting component. In yet further aspects, the stopping mechanism may be connected to a screw drive is configured to limit the forward motion for the tensile elements. In even further aspects, a stopping force of the stopping mechanism may be based only on intrinsic or physical properties of the device components, rather than force or torque generated by a power transmission component or actuator. In still further aspects, the stopping force of the stopping mechanism is not determined by strength of the power transmission component or a motor. In some aspects, the power transmission component or a motor does not provide any force or torque to the stopping mechanism to limit travel of a tensile element. In other aspects, the power transmission component or motor is not back drivable. In further aspects, the stopping force is at least about 1 lb. In still further aspects, the forward travel or motion of a plurality of tensile elements may be constrained by the same stopping mechanism.

In further aspects, exit points of various device components for the plurality of tensile elements can be configured to create a force vector dependent on the type of user interaction. In still further aspects, the exit points may be configured to produce a force vector and a relative displacement change in the length of each of the two tensile elements. In yet further aspects, the exit points may be configured to allow use of a single stopping mechanism, for example a stop block, for a plurality of strings and further configured to distribute the force based on which finger segment is contacting the virtual object first.

In further aspects, the device may further comprise at least one force sensor. In still further aspects, the force sensor may be configured to measure a force the user is applying to the device. In yet further aspects, the force sensor may be configured to measure the force the user is applying to the device to control the stop position to simulate dynamic virtual objects. In even further aspects, the force sensor may comprise at least one of: a pressure sensor, strain gauge, stretch sensor, current sensor on motor, and force gauge.

In further aspects, the motion position sensor may be configured to determine the linear travel distance of the stopping mechanism or stop block based on the number of measured revolutions of the lead screw and the lead screw dimensions. In still further aspects, the power transmission component or motor may be configured to turn the drive screw backwards, which can pull backwards on the user's finger. In yet further aspects, when the user relaxes their finger, a torsion spring may return the tensile element to a default position. In some aspects, the force sensor may be connected to or in operable communication with power transmission component, such as, for example, the lead screw. In further aspects, such as when the stopping mechanism is engaged, the lead screw may be pressed against the force sensing module based on the total force transmitted from the plurality of tensile elements through the engaged stopping mechanism.

In further aspects, the device may be configured to determine the total force applied by a plurality of contact points. In still further aspects, a stronger force may allow the stopping mechanism or stop block to move forward based on the material properties of a virtual object.

In further aspects, the device may further comprise a limit switch for use as a zeroing location. In still further aspects, the limit switch may be used to create a zero position for at least one of: a position sensor and motion position sensor during a calibration procedure. In some aspects, the limit switch may be located at the front of a motor control module or assembly.

In various aspects, the device may further comprise at least one support structure configured to support one or more device components. In further aspects, the support structure may comprise at least one of: a garment, enclosure, anchor, connector, housing, casing, shell, and exoskeleton. In still further aspects, the device may comprise a plurality of support structures. In yet further aspects, the support structure may be sized and shaped to be worn on or removably couple to the user or user's body part.

In further aspects, the device may comprise one or more enclosures for housing one or more device components. In still further aspects, the enclosure may be configured to attach or other enclosures or support structures. In yet further aspects, the enclosure may comprise a tensile element guide, segment cover, joint, or the like. In even further aspects, the enclosure may also be configured to guide the tensile element from the position detection module out to the user, for example, through channels disposed in the enclosure. In still further aspects, other device components may also further comprise channels configured to guide the tensile element. In some aspects, the support structure may comprise a tensile element guide comprising at least one channel configured to guide the tensile element. In other aspects, the support structure may comprise a garment configured to allow the tensile element to be woven in or physically incorporated into the garment. In further aspects, the channel may comprise at least one of an opening, aperture, and tubing. In still further aspects, the channel may be configured to guide the tensile element over the top of the coupled user area or user's body part. In yet further aspects, the channel may be configured to guide the tensile element over a top surface of a coupled finger to a fingertip without being felt by the user.

The support structure or casing may be manufactured of a flexible or pliant material such as for illustrative purposes a natural or synthetic woven or non-woven fabric, a rubber or other flexible polymer material, a silicone-based material, or may be a rigid material, such as a plastic, metal or wooden casing, wherein the support structure is a casing or container with walls to define an enclosed area. Other flexible or pliant or other materials may be employed. A material that will transfer vibrations is contemplated by the present invention.

The support structure may be any shape and may be in the shape of a three-dimensional polygon and the casing walls may define an interior space or interior sections for containing the operating elements of the invention. Any other shape (as used herein, the term shape is used in the broad sense of three-dimensional works) may be employed, so long as the shape is large enough and structured so as to be able to contain the various working components of the invention as more fully disclosed below.

In various aspects, the support structure may comprise a casing configured to house one or more device components. In further aspects, the casing may be shaped to conform to the contour of a surface of the body, may be configured to contains at least one device element. In some aspects, a casing or at least one surface of a casing, may be substantially planar to fit a flat surface of the body. In other aspects, a casing or at least one surface of a casing, may be shaped to fit a curved surface of the body. For example, one surface of a casing may be concave, shaped like the inner surface of a circle, and when the device contacts a surface, such as the top portion of an arm, the concave surface of the casing substantially contacts the surface, meaning that a majority of the concave surface is in contact with the area of the surface. This contact of substantially the entire concave surface of the device allows for enhanced transfer of vibration and/or thermal effect to the surface.

In further aspects, the support structure or casing may comprise an application area configured to transmit at least one of: a force, vibration, and thermal effect to a user's body part. In still further aspects, application area may comprise the portion of the casing for contacting the surface of the user's body part or for contacting a thermal element that in turn contacts the surface of the body. In still further aspects, the application area may be all or a portion of a proximal side of the device or device casing.

In further aspects, a thermal source or element cooperates with the application area to apply cold or heat to the user, and a vibrational source cooperates with the application area to apply vibration to the user. Further, the placement of the thermal element is variable so long as the effects of the thermal element can be felt on the subject at the appropriate time so as to produce the desired thermal effect. Still further, the placement of the vibrational source in the device is also variable so long as the vibrational effects of the vibrational source can be felt on the user so as to produce the desired stimulation of the user.

In further aspects, the casing may comprise an interior air chamber or pocket between the thermal source and or vibration source. The walls of the casing may define the air chamber and/or an interior space that, is sized to further contain at least one vibrational element and/or thermal element. In further aspect, the air chamber can be filled or emptied to control the level of thermal effect and/or vibration effect transmitted through the application area to the user. For example, the air chamber may be filled with a gas to maintain a gap between the application area and thermal source and/or vibration source to prevent or limit the thermal effects or vibration felt by the user through the application area. In further aspects, the gap distance between the user's body surface and application area can be in the range of from greater than 0.1 mm to about 10 mm. In still further aspects, filling and emptying the air chamber may controlled by a motor control module, motor, actuator, or like device.

In further aspects, the air chamber can also be configured to provide a predetermined amount of pressure to keep contact between the application area and the user's body surface. In yet further aspects the pressure may be from greater than 0 to about 3.0 kPa. In still further aspects, contact pressure can be sufficient to prevent unwanted transfer of thermal, force, or vibration effects in a given virtual sensation profile, such as may result during operation of the device or from other device components to which it is coupled.

In further aspects, the support structure may comprise a strap for releasably securing the device to a palm of a user. In still further aspects, the strap may be configured to apply a force to the palm of a user's hand. In yet further aspects, the support structure may comprise a garment sized and shaped to removably couple to a portion of a hand, such as a glove or the like. In some aspects, the garment may comprise at least one finger portion sized and shaped to removably couple to a portion of at least one finger. In other aspects, the garment may comprise a plurality of finger portions configured to couple to at least one of a first finger segment, a middle finger segment, or a fingertip. In further aspects, the garment may comprise an article of clothing. In still further aspects, the article of clothing may comprise at least one of a glove, sleeve, legging, pants, shirt, and body suit.

In further aspects, the device may comprise a plurality of support structures configured to couple to one or more proximal finger segments and distal finger segments. In still further aspects, the plurality of support structures may be movably connected to one another or other support structures by a connecting means. In yet further aspects, the connecting means may be configured to enable relative movement between connected support structures. In even further aspects, relative movement can comprise pivoting or bending or the like.

In various aspects, the support structure may comprise a hard material or soft material, or combinations thereof. In further aspects, the support structure may comprise a woven material or fabric, a non-woven fabric, or the like. In still further aspects, the support structure may comprise a rigid, thermoplastic material, or the like. In yet further aspects, at least one portion of the support structure comprises a woven material and a rigid, thermoplastic material.

In further aspects, the tensile element may be connected to at least one finger segment support structure. In still further aspects, the finger segment support structure may comprise at least one of a pad and band, and the like. In yet further aspects, the tensile element may be coupled to a finger segment using the finger segment support structure. In even further aspects, the finger segment support structure may be configured to pull on one or more tensile elements when the user moves a coupled finger forward.

In various aspects, the tensile elements may be utilized to provide positional data and/or force feedback. In further aspects, the device may comprise a plurality of position detection modules configured to capture motion of a plurality of finger joints. In still further aspects, a plurality of tensile elements may be connected to different parts of finger configured to create variable force profiles for various sensations. In further aspects, the tensile elements may be connected or coupled to a side of the finger for lateral movement, the top surface of the finger, or the palm side surface of the finger, or a combination thereof.

In further aspects, a force profile may comprise one more of the following components: time, amount of force, travel distance of tensile element, rate of change of amount of force, and rate of change of travel distance. In even further aspects, the amount of force may the force exerted on the stopping mechanism by a tensile element from the user, for example, as detected by a disclosed force sensor. In still further aspects, the travel distance may be a travel distance of the tensile element from a first position of the stopping mechanism to a second position of the stopping mechanism, for example, the travel distance from a stop position of a stop block to a new set position or target position of the stop block. In yet further aspects, the rate of change may be the rate of change for any of the foregoing component, such as, the rate of change in the travel distance or travel distance variations through moving the stopping mechanism to new set positions at a given interval. In some aspects, a rapid change rate or oscillation of the set position of the stop block, may help create a force profile corresponding to a throbbing sensation or pulsating sensation. In other aspects, a force profile for a rigid object may comprise a fixed travel distance and may have less impact from level of force from the user. In still other aspects, a force profile for a deformable object, for example a water-filled balloon, may have a variable travel distance to allow the user's body part to move back and forth according to the specific properties of virtual object.

In further aspects, the device may be configured to provide at least one of: variable force profiles and variable sensation profiles, for example, based on attributes of a virtual object. In still further aspects, the device may be configured to simultaneously provide a plurality of variable force profiles or a plurality of variable sensation profiles, or combinations thereof. In some aspects, the device may be configured to simultaneously deliver a first variable force profile to a user's finger and deliver a second variable force profile to a different user finger. In other aspects, the device may be configured to provide different variable force profiles or different variable sensation profiles at any rate or at any time interval.

In various aspects, the device may further comprise a microcontroller in operative communication with at least one of the position detection module and haptic feedback system. In further aspects, the device may further comprise at least one of: wireless module, power source, vibration source, thermal source, and air chamber. In still further aspects, the wireless module may be configured to send and receive data from the sensors and motors on the glove to the computer. In yet further aspects, the power source may be configured to provide power one or more device components.

In further aspects, the disclosed devices further comprise one or more of the following components: a voltage regulator, power switch, power management module, battery management module (e.g., fuel gauge), battery charging module, wireless power coil or receiver, wireless power control module, antenna, transceiver, motor controller, interface module, voltage sensor, current sensor, modulation module, and power input.

As described herein, various embodiments of the invention may include at least one of: one or more vibration sources and one or more thermal sources in each haptic interface device. In yet further aspects, the vibration source is configured to produce vibration upon activation. If the user is wearing the device on his or her hand, the vibration source vibrates at least between the user's hand and the coupled device. In an embodiment of the invention, the vibration device may vibrate directly against the coupled body part of the wearer of the haptic interface device.

In further aspects, vibration effects can be provided by any desired vibrational element such as, for illustrative purposes, a vibratory motor provided within the device or device casing. Once vibration is activated by providing power to the vibratory element, such as a vibratory motor, the vibration may be constant and continual, or the vibration may be intermittent, and cycle on and off at the same or a different vibration speed or frequency.

The vibration source of the embodiments of the invention may be of any technology that achieves the function of vibrating between the body part of the user and the haptic interface device. In various aspects, the vibration element arrangement and construction of the haptic interface device can be configured to correspond to areas of a user's body where sensory transmission are greatest.

In still further aspects, the device may comprise a plurality of vibration elements. In further aspects, the vibration elements can be any conventional vibrational source or means for producing vibrations. Non-limiting examples of suitable vibration elements include elliptical flywheel motors, eccentric motors, and the like. It is only important that the vibration element be able to transfer vibration to the subject at a sufficient level to produce the intended effect of the user. For example, and without limitation, vibration elements in a device of the present invention can provide vibrations of between about 75-500 Hz.

In various aspects, the force level may be defined by reference to the intensity of the pressure exerted on a given area. To this end, the intensity of a force may be characterized as the strength or power of the pressure that the user feels when in contact with the force. In further aspects, the force level or intensity of the vibration source may be defined by reference to the amplitude and the frequency of the vibrations of the vibration source or element. To this end, the amplitude of a vibration of a vibration device is characterized as the strength or power of the vibration that the user feels when in contact with the vibration. In further aspects, high amplitude vibrations may be strong vibrations that a user feels are more powerful or forceful against his or her body than a weak vibration having a low amplitude. In still further aspects, wherever on the spectrum of amplitude a vibration falls, the vibration also may be characterized by its frequency. In yet further aspects, a low frequency translates in this description as a slow vibration. High frequency is a quick or fast vibration. Thus, as further described herein, a vibration that may be applied by a vibration device according to the present invention may be, in various embodiments, strong and slow, weak and quick, strong and quick, weak and slow, and the ranges between.

In various aspects, the components of the disclosed haptic interface devices can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In a further aspect, the haptic interface device and system can comprise an engagement means for coupling and holding components together. In a further aspect, the engagement means can be a screwing mechanism, a click-lock mechanism, or friction mechanism, or the like.

In a still further aspect, the device and system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof. In further aspects, the device may comprise a securing means configured to releasably secure the device to a user or user's body part. In some aspects, the securing means may comprise a palm strap configured to releasably secure the device to the back of a user's hand.

In further aspects, the device may further comprise at least one peripheral mount configured to detachably connect at least one peripheral computing component or accessory. In still further aspects, the peripheral computing component or accessory can comprise a tracker or tracking device, such as, for example, tracking devices that are operable with VR, AR, or computing systems.

In further aspects, the device component characteristics and configuration, such as, for example, size and dimensions, can be configured to adjust for an individual user's weight, size, and other factors to achieve optimal force load balancing and distribution. In further aspects, features of the haptic interface device and components may be configured or utilized to set and/or control the force feedback characteristics. For example, at least one of the following may be configured: the type of material used for the haptic interface device casing or housing; the device element dimensions (e.g., height, width, thickness, surface-contacting area, etc.); the flexibility or "stretchiness" of the haptic interface device casing material; the force transmission characteristics of the casing material; and the extent of exterior surface coverage of surface-contacting portion of the haptic interface device.

In further aspects, while portions of the haptic interface devices described herein can be permanently mounted in or on a garment or body part-receiving support structure, this is not a requirement. For example, portions of the haptic interface devices can be connected to or disposed within an attachment configured to be removably mounted on a garment (or connected to a device assembly configured to be removably mounted on a garment or other body part-receiving support structure), e.g., to allow interchange and/or replacement of the haptic interface devices between different users.

In further aspects, the haptic interface devices may further comprise on opening through a wall or an outer surface for providing an amplifier that is connected to the controller or a sound element contained within the haptic interface device. In still further aspects, the device may comprise an opening through the outer surface for providing a light, such as an LED light, that is connected to the controller. A light (and/or sound) may be turned on when device or operation is initiated and turned off when power to the haptic interface device is turned off. Components for switches, controllers, such as a polycarbonate circuit board and the programming to accomplish the disclosed activities and others, and elements such as sensing elements, sound elements and lights, can be selected or commercially acquired by those of skill in the art. Wires for connecting the elements within the haptic interface device are contemplated by the present invention.

In further aspects, the user may comprise a mammal. In still further aspects, the mammal may comprise a human. In yet further aspects, the user's body part may comprise a limb, extremity, finger, fingertip, arm, hand, leg, foot, or appendage, or combinations thereof. In even further aspects, a finger may comprise at least one of an index finger, middle finger, ring finger, a little finger, and thumb, and combinations thereof.

As described in detail herein, in further embodiments of the invention, the haptic interface device may include at least one controller or microcontroller to receive the communications from the external device, to pass them on as instructions to the haptic interface device, to receive data or information from the haptic interface device, and/or to send the information to application software on the external device. The controller may include elements to carry out its function. For example, the controller may include a receiver/transmitter, transceiver, and/or antenna for communicating with the wireless device. The controller may include computing elements such as a microprocessor, etc. to process and execute the instructions, information, and/or signal received from external devices or process the information from the haptic interface device.

According to various aspects of the disclosure, the devices and systems of the present invention provides a number of advantages over current haptic interface devices. The combination of inventive device configurations, construction, and positioning allow the disclosed haptic interface devices and systems to be more effective and efficient in providing force feedback, for example, in haptic device where the force feedback actions rely on power, such as when actuated by a powered component, for example, a motor or actuator. In further aspects, the amount of force that the inventive devices can apply to the user is not constrained by the power of a power transmission component, for example, a motor or actuator. In still further aspects, the devices of the present invention only require the motor or actuator in the device to be powered for the time it takes to move the stopping mechanism or stop block to the corresponding stop point or position for given force feedback or force profile. In yet further aspects, once the stopping mechanism or stop block is moved to the stop point, the motor can shut off while still creating the force feedback by holding the finger back. In even further aspects, this feature advantageously allows the device of the present invention to has significantly less power requirements for employing force feedback than devices employing most other methods of force feedback.

According to various aspects of the invention, the haptic interface devices and systems of the present disclosure can comprise multiple configurations. FIGS. 2-9 show various exemplary embodiments and methods for using the invention.

Figure 2:
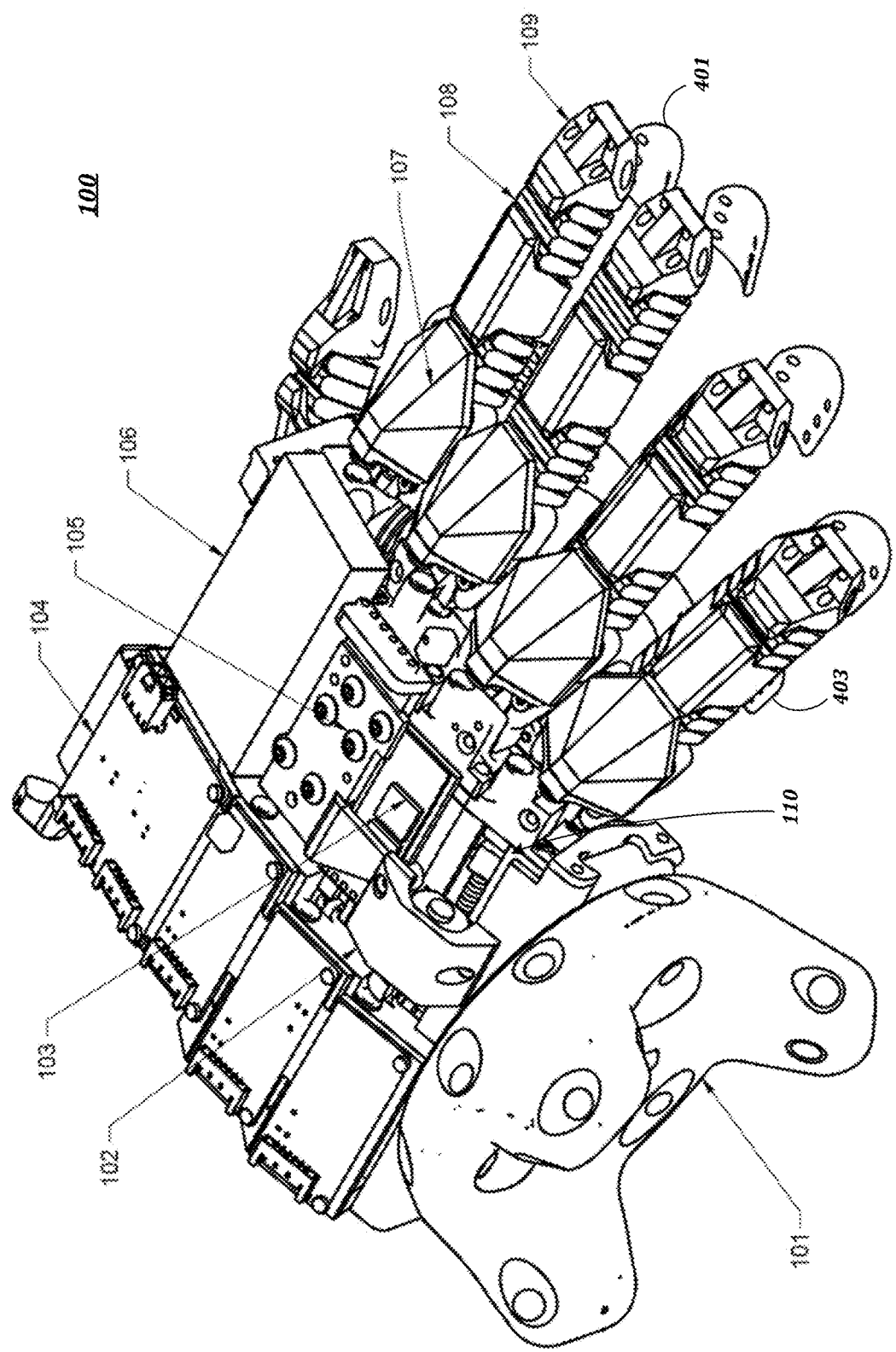
FIG. 2 shows a diagram depicting a device in accordance with an exemplary embodiment of the present invention.
Figure 3:
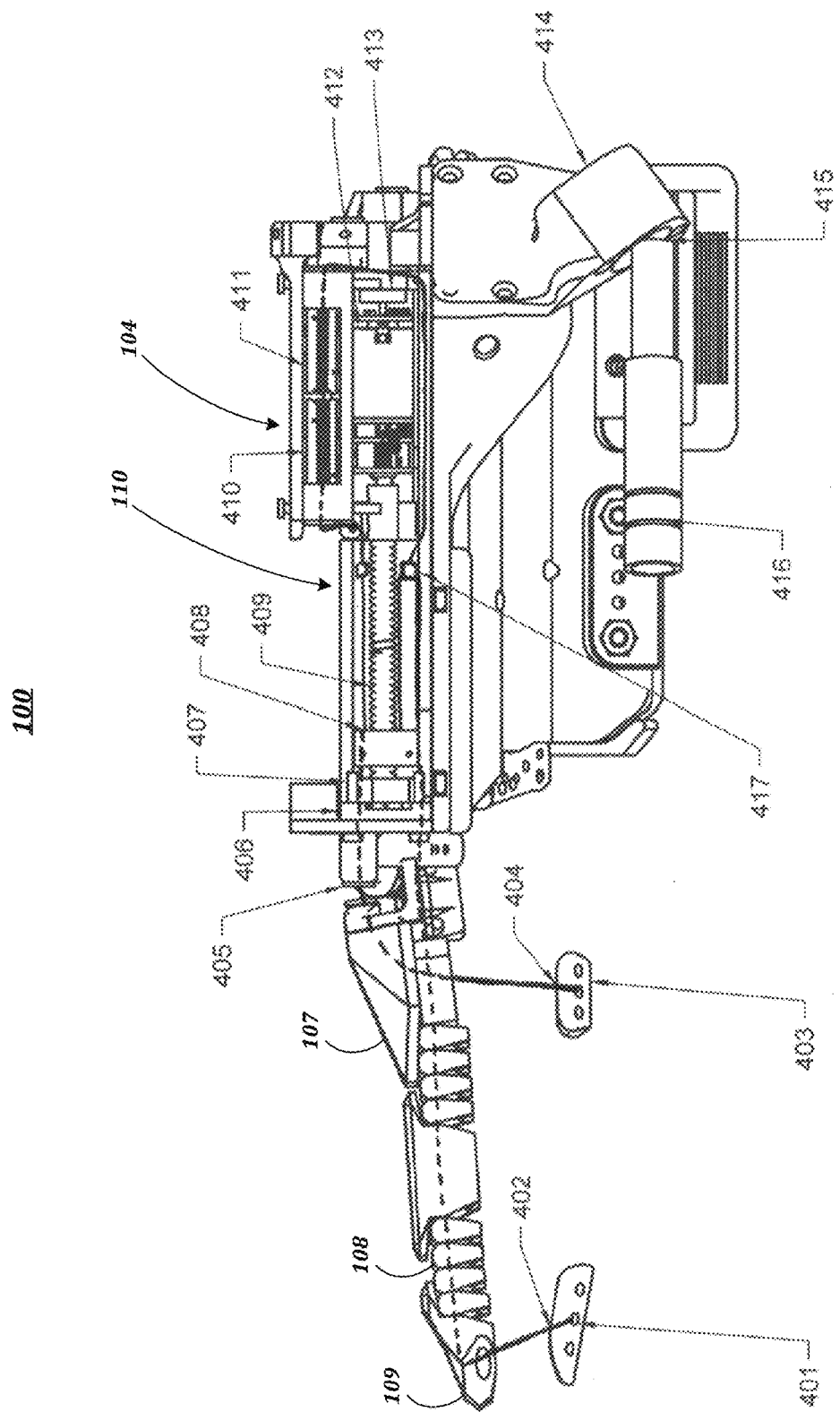
FIG. 3 shows a diagram depicting a device in accordance with exemplary embodiments of the present invention.
Figure 4:
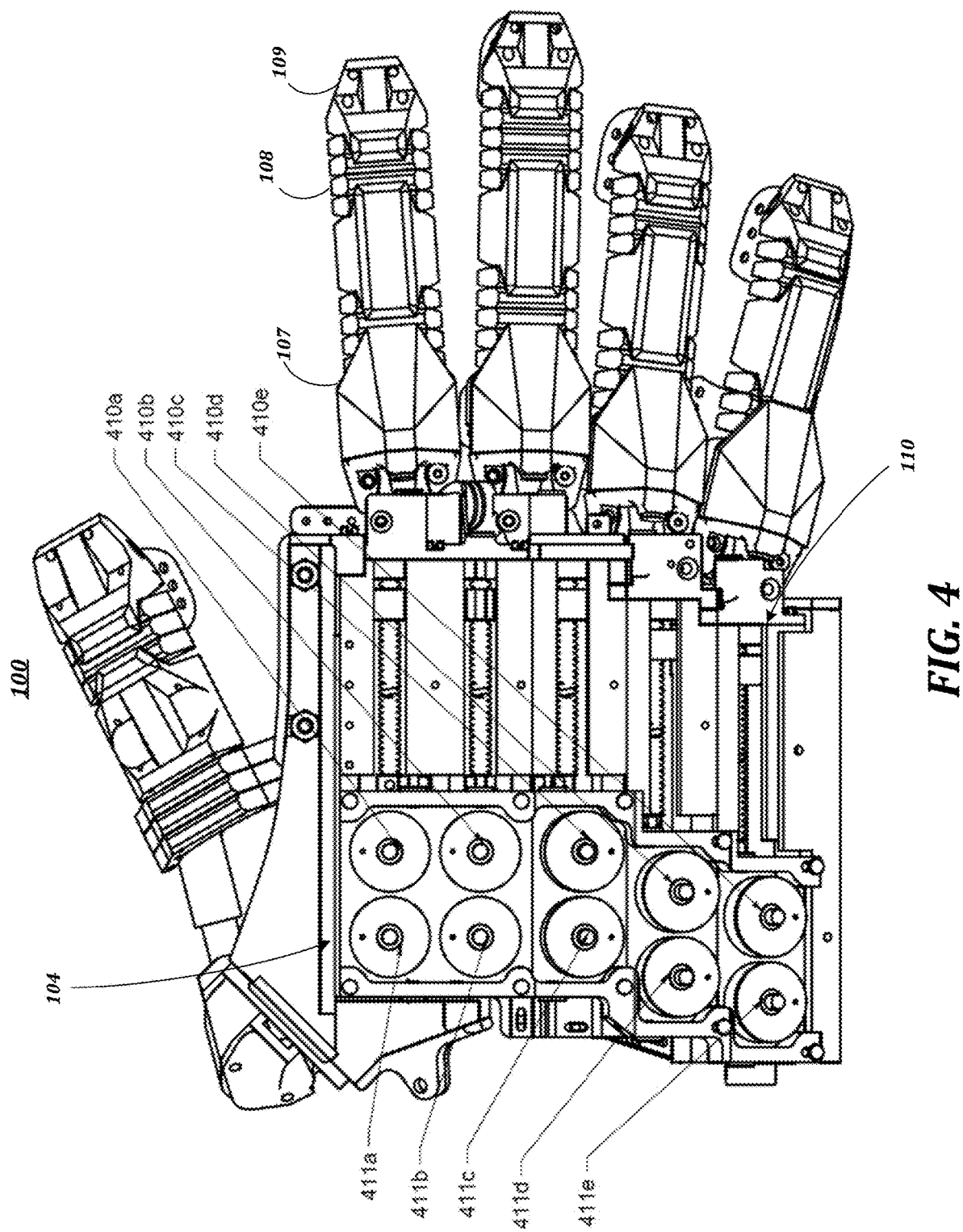
FIG. 4 shows a diagram depicting a device in accordance with exemplary embodiments of the present invention.

FIGS. 2-4 show diagrams of an exemplary embodiment of a haptic interface device configured to worn on a hand of a user in accordance with the present invention. As shown in FIG. 2, the haptic interface device 100 comprises a plurality of position detection modules 104 configured to determine positional data for determining a position of different portion of each finger of the user; and a plurality of haptic feedback modules 110 configured to produce force feedback to different portion of each finger of the user. In the present embodiment, the device further comprises various housings and casings, including proximal guide housings 107, segmented guide housings 108, and fingertip guide housings 109. As further detailed in FIG. 3, the housings comprise channels configured to guide the tensile element to the coupled portion of the finger where the tensile element attaches, such as the attachment points on finger pad 401. The housings and channel cooperate to guide and maintain the tensile element substantially parallel to and above the top surface of a given finger until it reached the desired coupling portion of the finger, at which time the tensile element is redirected in a substantially 90-degree angle towards the bottom surface of the finger to the attachment point. In still further aspects, the present embodiment further comprises a battery 106, tensile element end plate 105, wireless module 103, a vibration source 102, and tracking device 101 configured as part of a VR system. In other embodiments, the various device components may be attached to or integrated with a garment, for example a glove, such that device can be comfortably worn by a user during use.

As shown in FIG. 3, the device comprises a plurality of tensile element configured to couple different portion of each finger of the user, specifically, a distal tensile element 402 configured to couple to a fingertip segment of the finger using fingertip pad 401 and a proximal tensile element 404 configured to couple to a proximal segment of a finger using proximal pad 403. As further described herein, the tensile elements are in operable communication with and cooperate with both the position detection module and motor control module to: produce positional data of the various parts of the finger, produce a predetermined range of motion for coupled portions of the finger, produce applied force to the coupled portions of the finger as part of the force feedback.

As shown in FIG. 4, each position detection module 104 comprises a pair of cylinder elements containing positional sensors, specifically a base segment pulley (410*a*, 410*b*, 410*c*, 410*d*, 410*e*) with positional sensor and a middle segment pulley (411*a*, 411*b*, 411*c*, 411*d*, 411*e*) with positional sensor. Referring again to FIG. 3, the tensile elements, which may comprise a filament or string, are connected to and configured to be pulled from and wound up into the pulley. The pulleys comprise a retraction mechanism, such as a torsion spring, to maintain a tension level and to return the tensile element to a start or default position. The positional data is determined based at least on measuring tensile element stroke length caused by movement of the finger. In operation, the sensors measure rotational motion data from the cylinder element for a plurality of axes, and linear displacement of the tensile element is determined by mapping rotational data to a linear distance based on cylinder dimensions. In further aspects, the force exerted by the retraction system to maintain the tension level and or retract the tensile element is minimal such that it cannot be perceived by the user or effect the force feedback effects.

In various embodiments, the device can further comprise an additional position sensor adjacent to motion control module 110 and proximal exit 405 near the base of the finger to generate positional data associated with lateral angle data (e.g., side to side movements) and vertical angle data (e.g., up and down movement) from movement of the user's finger. In further aspects, the sensor can also allow calculation of the absolute contraction angle of the proximal knuckle, which, according to further aspects, can be used to increase the accuracy of the proximal tensile element reading.

In further aspects, the distal tensile element can use a 2:1 travel length adjustment or step-up to increase the total travel length of the tensile element. The proximal string tensile element not have a travel length adjustment, and the travel distance of the string is 1:1 relative to a travel stop position because the string does not need to travel as far for the proximal tensile element. In still further aspects, the tensile elements can exit the device at different locations in order to match the natural finger movement, for example, proximal exit 405. In this aspect, the proximal tensile element can be elevated at the proximal knuckle in order to emphasize the travel distance of the created by rotating the proximal knuckle. In other aspects, the distal tensile element can exit closer to the surface of the hand in order to minimize the travel length caused by moving the proximal knuckle. As represented by the dashed lines, the exit locations can cooperate with the various finger housings and channels to guide and maintain the tensile element at the desired plane and path to the attachment point.

In various aspects, the absolute position of all three joints in each finger in the plane of contraction can be calculated by comparing the relative string lengths and implementing the relationships between the last two knuckles. For example, during natural finger bending, there is a fixed relationship associated with the movement of the last two finger joints. In one aspect, only the proximal tensile element is used to calculate the proximal angle. In further aspects, since the distal tensile element is affected by all three joints, the data from the proximal tensile element can be subtracted to calculate the portion of travel caused by the final two joints. In still further aspects, like during grasping, the finger movement may match the virtual object geometry for the distal knuckle (e.g., pinching a rectangle). In this embodiment, the distal knuckle angle may not be directly measured by the sensors but may be interpolated based on the virtual object.

In further aspects of FIG. 3, a similar two tensile element configuration can be used for the thumb. Here, the device comprises a thumb joystick 415, joystick extension tube 416, and a thumb sensor housing 414 comprising a positional sensor, such as a 3-axis hall effect sensor, which can measure the absolute position of the metacarpal bone in the thumb over the entire range of the metacarpal joint. To this end, a first tensile element can also attach to the proximal finger segment of the thumb, and a second tensile element can attach to the distal portion of the thumb. Since there is no middle segment for the thumb, all of the joints in the thumb can be directly measured with no additional interpolation. In further aspects, the joystick extension tube is utilized to allow the ability of the user to move the thumb freely so that various relationship between the users thumb and joystick sensor is maintained.

In further aspects, the motion control module 110 comprises a linear drive screw motion system including lead screw 409, stop block 408, thrust bearing 406, force sensor 406, gearmotor 412, and motor encoder 413. While other drive systems can be used, the lead screw 490 and stop block 408 used in this embodiment has similar performance characteristics as other systems with the added benefit of not being back drivable, and the stopping force can be determined using the strength of the individual component and connections. To this end, a single motor per finger can drive the stopping mechanism or stop block 408 back and forth to various stop points according to a given force profile, and both the proximal tensile element and the distal tensile element will be constrained in forward motion, for example, when tensile element connector 417 reaches the stop block, by the same stop block to create the desired force feedback.

In various aspects, the exit points for both tensile elements can be tuned to create a force vector that is dependent on the type of grasp employed. For example, bending the proximal knuckle only will apply force to limit the rotation of the proximal knuckle first. In further aspects, the user can only rotate the middle and distal knuckles. When the distal tensile element connector reaches the stop block, all three joints will be locked in flexion, creating a much more realistic feeling.

In further aspects, the force sensor 406 may be is positioned inside of an internal mechanism within the motor control module such that when the stop block is engaged, the lead screw is pressed against the force sensor 406 based on the total force applied by both the proximal and distal tensile element. In still further aspects, this force sensor configuration allows for a more robust, compact, device, and also allows the ability to read the total force applied at multiple contact points.

In further aspects, the motor encoder 413 can determine linear travel based on the lead screw dimensions and the number of revolutions. A limit switch at the front of the motor control module may be as a zeroing location since the encoder only measures relative position and not absolute. To this end, the limit switch can allow creation of a zero position for both the motor encoder and tensile element encoders during calibration procedures. In some embodiments, the device can be configured to extend the force feedback to the palm of the hand or the ball of tissue under the proximal knuckle. To this end, the device can further comprise a controlling strap that can wrap around the hand, while using various tensile elements to determine which knuckle to apply pressure to.

In various further aspects, as each knuckle in the finger bends, the tensile element may be pulled by some distance equal to =(rotation angle*pi/180)*radius of curvature. In yet further aspects, this arc length can create a linear travel in the tensile element that is converted back into a rotation at the magnetic encoder based on the diameter of the cylinder element or spool. Therefore, the angle of the finger rotation can be directly proportional to the angle measured with the positional sensor. The side to side movement of the fingers and the metacarpal in the thumb can be a 1:1 mapping of the 3D vector produced in the front mounted positional sensors. In further aspects, position can be determined by two rotations that can be mapped to the joint rotations of the finger on both halves. In still further aspects, the additional positional sensor in the front near the base of the finger can add additional measurements.

In further aspects, there may be a positional sensor on the front of the device near the proximal knuckle that determines the side to side movement and up and down movement of the proximal phalange. In still further aspects, there may also be an additional cylinder element and tensile element on the top of the hand and this tensile element goes to the proximal phalange to measure the proximal contraction angle as well. In this aspect, the device could comprise three positional sensors per finger. In yet further aspects, the device could comprise one positional sensor that can give a direction vector, or rotations relative to all three axes for the first member on the finger.

Figure 5A:
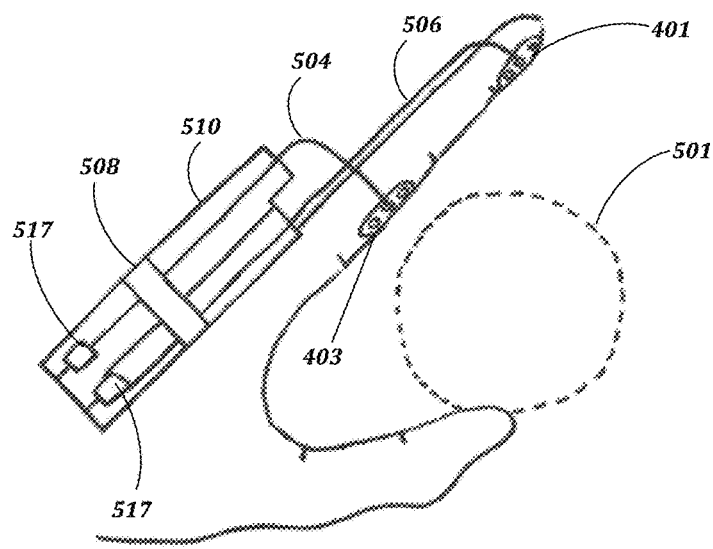
FIGS. 5A-5C show diagrams depicting force feedback from a disclosed device consistent with an exemplary embodiment of the present invention.
Figure 5B:
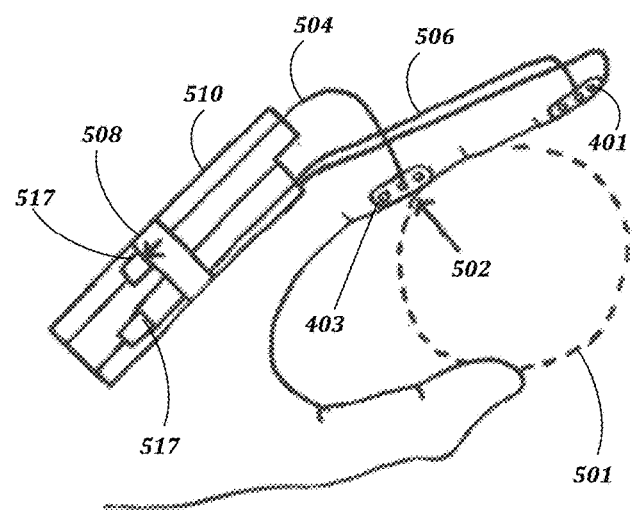
Figure 5C:
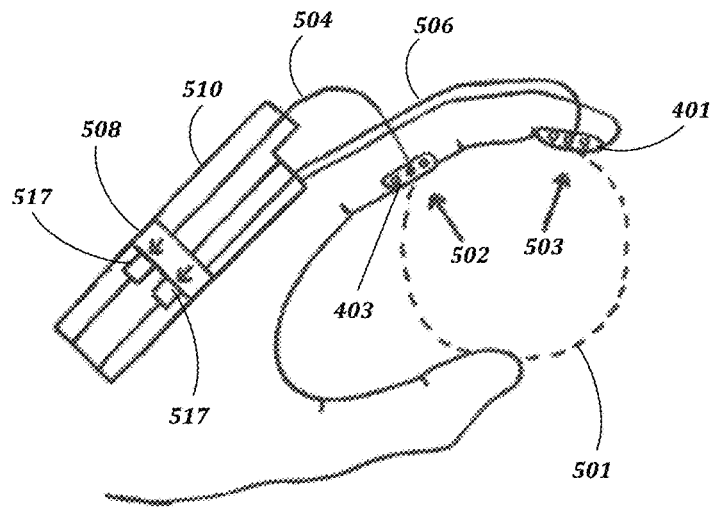

FIGS. 5A-5C show illustrations depicting stages of a method employing force feedback to a user using a device of the present invention. FIG. 5A shows a virtual ball 501 located in a user's grab area, which may comprise a predefined volume in the user's virtual environment. Upon the virtual ball 501 entering the user's reach or grab area, the stop block 508 of the motor control module is moved to a stop position (e.g., from the default position at the end of the motor control module near the fingers) to provide the expected or appropriate force feedback based on the virtual object's properties.

FIG. 5B shows the user bending their first knuckle while keeping the other two knuckles straight. When the stop bead 517 of the first tensile element 504 hits the stop block, the tension in the tensile element transmits a force to the finger through attached the base pad 403. In various aspects, this action simulates the sensation of contacting a first surface point 502 of the virtual object, while also limiting motion of the base finger joint.

FIG. 5C shows the user bending their middle and end knuckle until the stop bead 517 of the other tensile element 506 also reaches the stop block 508. Tension is then transmitted down the line to the fingertip pad 401 and is felt by the user as a force that mimics the feeling of a second surface point 503 of the virtual object.

FIGS. 6A-6D show diagrams of alternative tensile element configurations for the device in accordance with the present invention. In some embodiments described above, each tensile element was in operable communication with both the position detection module and the motor control module, and thus a single tensile element was used in determining both positioning data associated with the position detection module as well as generating force feedback associated with the motor control module.

However, in some embodiments, a tensile element may only be in operable communication with either the position detection module or the motor control module. That is, one or more tensile elements may be used in determining positioning data, for example, associated with the position detection module, but excluded from use in generating force feedback, for example, with the motor control module.

Figure 6D:
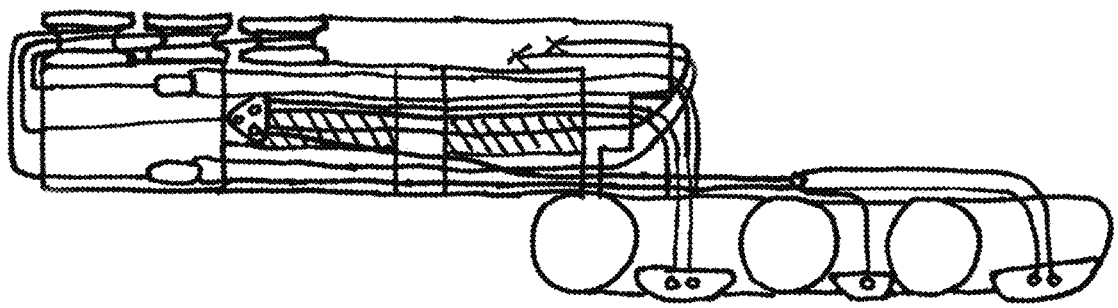
FIGS. 6A-6D show diagram depicting various configurations of devices in accordance with exemplary embodiments of the present invention.
Figure 6C:
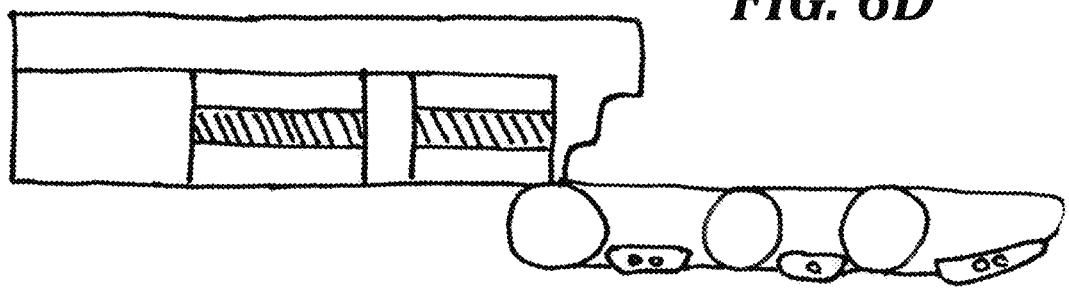
Figure 6B:
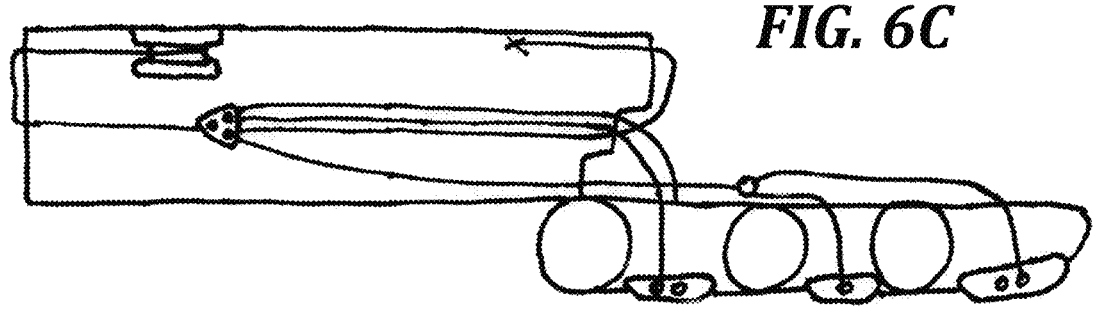
Figure 6A:
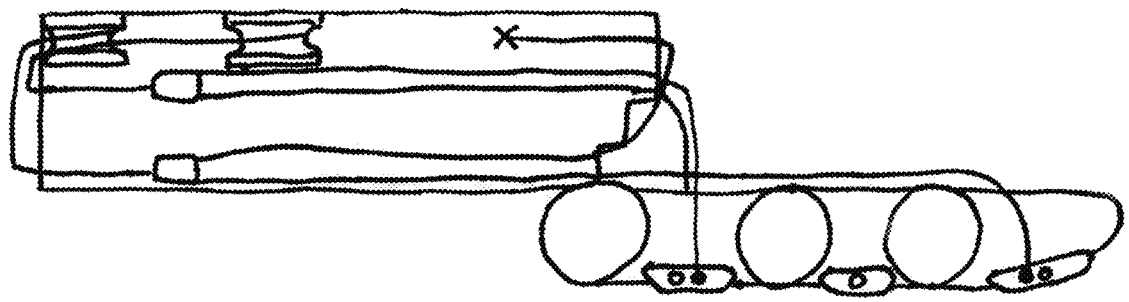

FIG. 6A shows a tensile element configuration for sensing position data comprising two tensile elements, each coupled to a different portion of the finger, while FIG. 6B shows a tensile element configuration for providing force feedback comprising a single tensile element couple to three different portions of the finger.

FIG. 6C shows a motor control module comprising a motor, lead screw, and stop block for creating a stop position to constrain forward motion of a tensile element traveling through the stop block, as described herein.

FIG. 6D shows a composite diagram showing a composite configuration overlay the features and elements of FIGS. 6A-6C. Here, only the portions of the force tensile element from FIG. 6B are traveling through the stop block, and would thus only, be constrained from forward movement by the stop block. Advantageously, the stop bead of the force tensile element is off set from the connectors of the sensing tensile elements, so the likelihood of the stop block hitting the sensor tensile elements connector when back drive is decreased, which in turn, decreases the chance of creating inaccurate data points and force profiles based on the inaccurate data. In further aspects, the correlation between the offset of the force strings and the sensor strings can be used to enhance the applied force data from the force sensor or use it separately. In still further aspects, the offset distance may decrease as pressure from the user pulls the sensing strings after the force strings have been constrained by the stop block.

Figure 7:
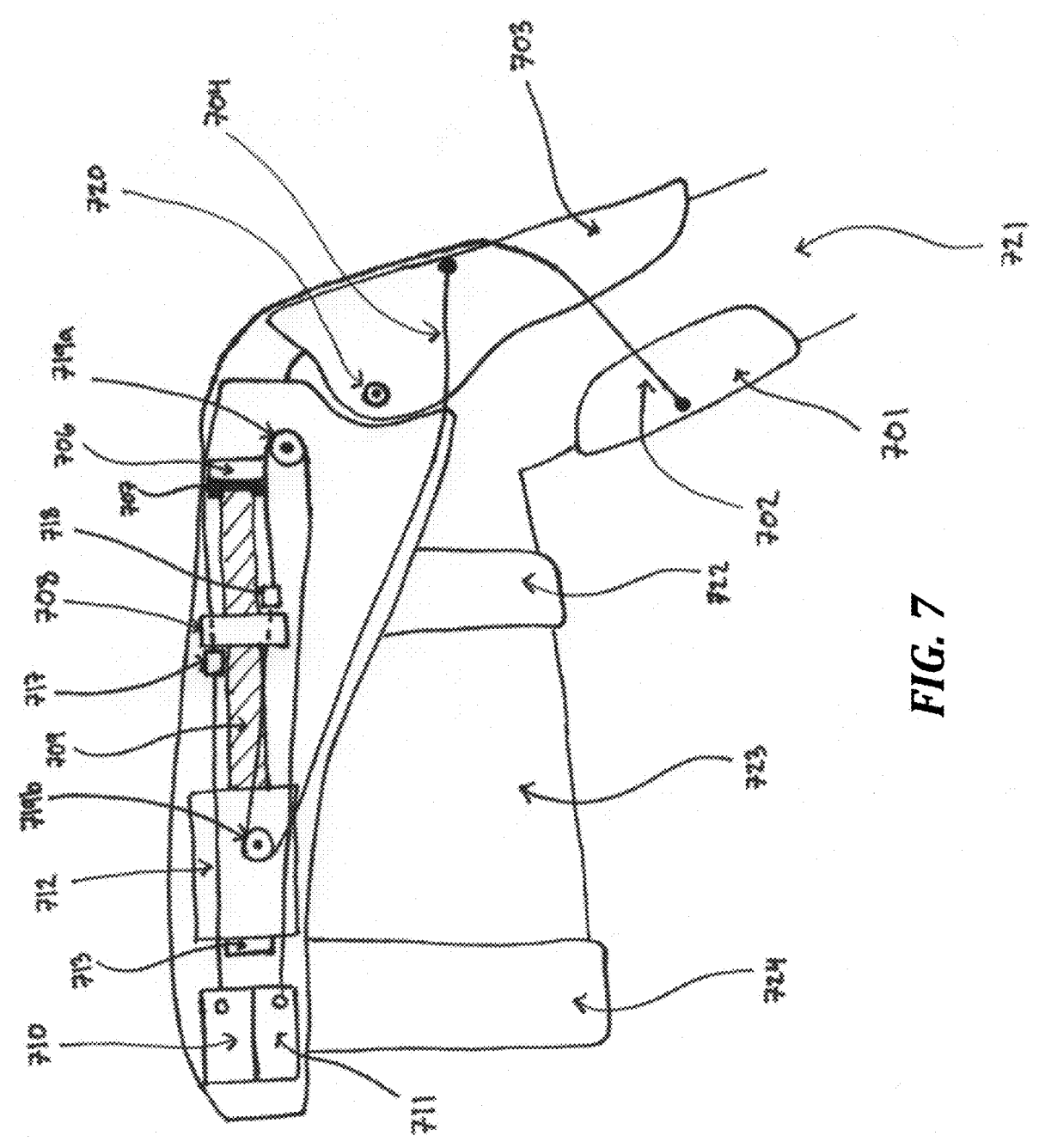

While many of the aspects and features of the above embodiment relate to a user's hand, and are described in, the context of a glove, further embodiments of the present disclosure are not limited to use only in this context, and can include input device configured to operate with any number of portions of a user's body, including but not limited to a wrist, elbow, shoulder, knee, ankle and the like. In still further embodiments, FIG. 7 shows an input device configured to be worn on a user's knee. In further aspects, the device comprises a plurality of tensile elements configured to couple different sides of the distal limb segment 721, specifically, a flextal tensile element 702 comprising a flextal tensile element connector 717 and configured to couple to the inner surface of the distal limb segment using flextal pad 701; and an extension tensile element 704 comprising an extension tensile element connector 718 and configured to couple to an outer surface of the distal limb segment using extension pad 703. As further described herein, the tensile elements are in operable communication with and cooperate with both the position detection module (710 and 711) and motor control module 712 (comprising thrust bearing 707, force sensor 706, and lead screw 709) to: produce positional data of the joint 720 that connects the proximal limb segment 723 to the distal limb segment 721, produce a predetermined range of motion for the joint 720, and produce applied force to the coupled joint 720 as part of the force feedback. The device may further comprise string guide pulley 719a and 719b for travel adjustment and first mounting strap 722 and second mounting strap 724 for securing the device to the user's body part.

As described herein, the present invention includes methods of using the disclosed haptic interface devices and systems. For example, in another exemplary aspect, the present disclosure provides a method for interacting with a virtual reality environment using a disclosed haptic interface device or system.

Figure 8:
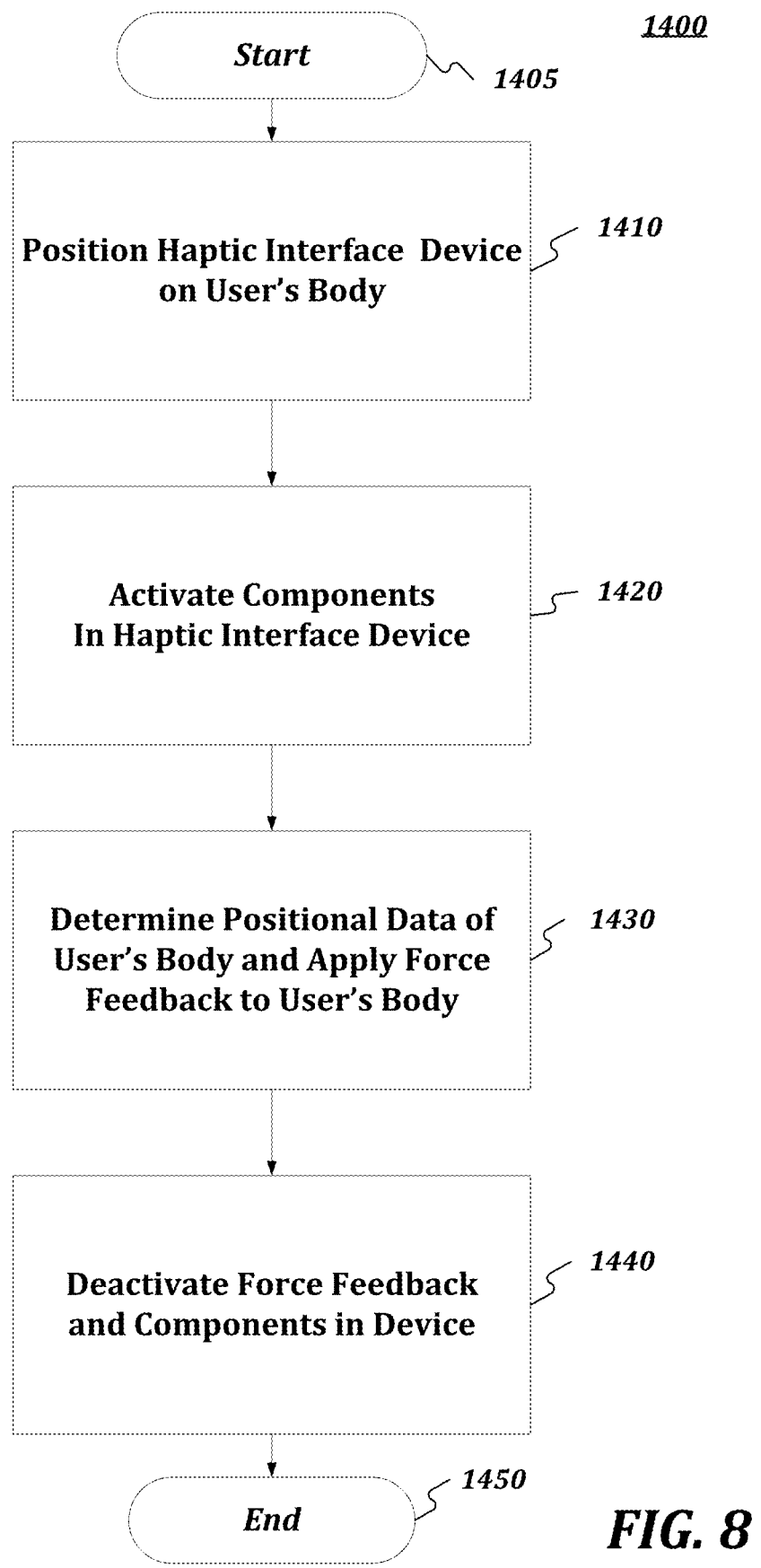
FIG. 8 shows a method for using the disclosed device and systems in accordance with another exemplary embodiment of the present invention.

FIG. 8 is a flow chart setting forth the general stages involved in a method 1400 consistent with an embodiment of the disclosure for operating the disclosed haptic interface devices and systems. Method 1400 may be implemented using, at least in part, a controller 1500 (e.g., on-board computing device) as described in more detail below with respect to FIG. 9. Controller 1500 may comprise a controller for operating the haptic interface device and components as well as performing other operational tasks, including, but not limited to, force feedback control and parameters, and communication. As such, controller 1500 may be in operative configuration and communication with, for example, but not be limited to, position detection modules, haptic feedback modules, tensile elements, vibrational elements, thermal elements, communication modules, power source, various sensors, transceivers and antennas. As will be detailed with reference to FIG. 9, controller 1500 may comprise a remote communication module to enable remotely operation as described herein. In other embodiments, controller 1500 may be completely self-operating upon configuration.

Furthermore, although stages are disclosed with reference to controller 1500, it should be understood that a plurality of other components may enable the operation of method 1400, including, but not limited to, other computing components, mechanical components, virtual reality environment properties (e.g., virtual object properties), user conditions, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1400 may begin at starting block 1405 and proceed to stage 1410, where the haptic interface device may be placed on a body part of a user, for example, a hand in gloves embodiments. From stage 1410, where the haptic interface device is positioned on the user's body part, method 1400 may proceed to stage 1420 where the haptic interface device and/or components may be activated. The activation of haptic interface device components, though disclosed in a particular order for illustrative purposes, may occur in other arrangements. Upon activation, the haptic interface device may determine positional data of various parts of the user's body and move the stopping mechanism of the motor control to a stop position to create the appropriate force feedback effects. In some embodiments where present, one or more vibrational elements may begin to vibrate and/or one or more thermal elements may be activated to provide heat and/or cool to the user's body part.

In various aspects, user may activate or de-activate (and/or otherwise control operation of) the haptic interface device by using a VR control unit, such as an external device that is in operative communication with the haptic interface device. The external device may be a device that may be used for additional purposes other than use with the invention such as a mobile phone, tablet computer, notebook computer, desktop computer, etc. In an embodiment, the invention may provide a specialized external device for use with the invention, such as for detecting optical sensors disposed on the haptic interface device. The specialized external device may include other uses, if its use is not limited to this particular embodiment of the invention.

Controller 1500 (e.g., on-board computing-device) may automatically activate haptic interface device elements instantly or after a set amount of time has passed since the launch. In other embodiments, activation may occur upon certain reading from on-board sensors (e.g., including, but not limited to, position sensors deployed in the haptic interface device). For example, operation of one or more haptic interface device elements may be dependent on certain virtual environmental factors and/or user conditions such as, for example, a virtual object moving into a pre-defined volume of the virtual environment in the vicinity of the user, for example, into the user's grab area or reach, and the like. Controller 1500 may be configured to trigger operation of various haptic interface device components upon the satisfaction of certain pre-set conditions. Such conditions may be defined prior to activation.

From stage 1420, where the haptic interface device components are activated, method 1400 may proceed to stage 1430, where the force feedback effects may be maintained at the site of the user's body part for a time sufficient to produce a tactile sensation in the body. From stage 1430, where the haptic interface device is used to provide force feedback, method 1400 may proceed to stage 1440, where the device components are returned to a default state or configuration; or deactivated upon the user performing the appropriate action. After stage 1440, method 1400 may end at stage 1450.

In further aspects, other methods of the present invention can further comprise, in addition to or optionally instead of force feedback actions, at least one of: activating vibration by the vibration elements in an intermittent or continuous vibration and applying a thermal effect by the thermal element simultaneously with the force feedback.

In further aspects, the haptic interface device component may be allowed to act upon the user for a time necessary to produce the desired tactile sensation or effect which can be for a period of microseconds up to a period of several milliseconds or more, or may be from greater than 0 microseconds to about 1000 milliseconds. Note: Could be indefinite In various embodiments, integrated controller 1500 may be pre-configured with operational control instructions and/or data. In further aspects, the disclosed haptic interface device and systems may comprise, but not be limited to, an integrated controller and/or on-board computing module. The computing module may be in operative configuration and communication with, for example, but not be limited to, position detection modules, haptic feedback modules, tensile elements, vibrational elements, thermal elements, communication modules, power source, various sensors, transceivers and antennas. Further, the computing module may be in operative communication with another computing or external device consistent with the description herein, and may comprise, but not be limited to, an external imaging device, virtual reality system and devices, wireless device, smart phone, desktop computer, laptop, a tablet, or mobile telecommunications device. Such remote or external devices may be used to control and/or configure integrated computing module (e.g., activation conditions, force feedback operating parameters and settings, and the like).

Moreover, the devices may be in operative communication with a centralized server, such as, for example, a cloud computing service. Although operation has been described to be performed, in part, by a controller 1500, it should be understood that, in some embodiments, different operations may be performed by different networked elements in operative communication with controller 1500.

Embodiments of the present disclosure may comprise a system having a memory storage and a processing unit. The processing unit may be coupled to the memory storage, wherein the processing unit is configured to perform the stages of method 1400.

Figure 9:
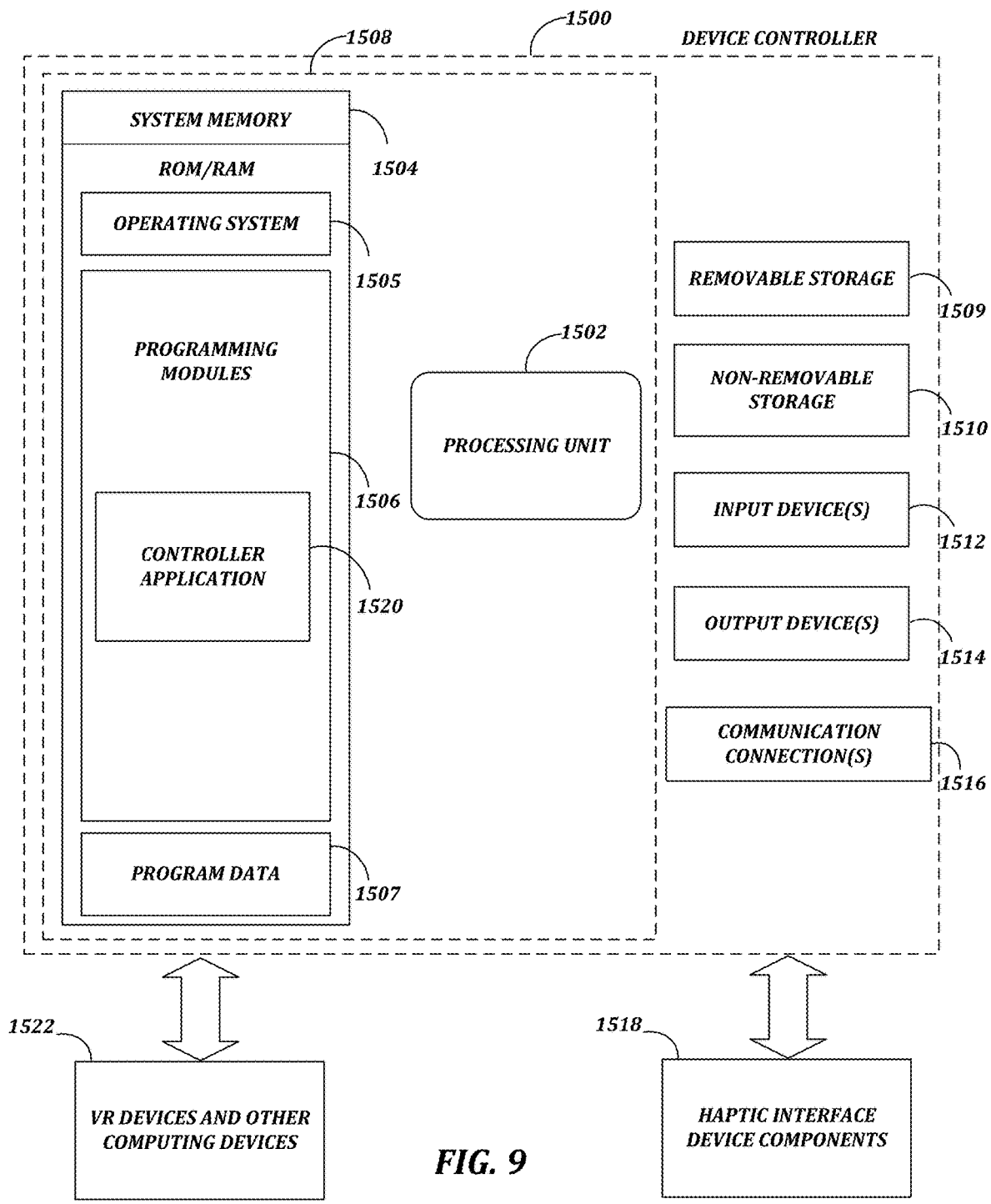
FIG. 9 shows a diagram of a system including a computing device for enabling operation of the disclosed devices in accordance with another exemplary embodiment of the present invention.

FIG. 9 is a block diagram of a system including controller 1500. Consistent with an embodiment of the disclosure, the aforementioned memory storage and processing unit may be implemented in a computing device, such as controller 1500. Any suitable combination of hardware, software, or firmware may be used to implement the memory storage and processing unit. For example, the memory storage and processing unit may be implemented with controller 1500 or any of device components 1518, or any VR devices and external devices 1522, in combination with controller 1500. Other vibration devices and components 1518 may comprise, for example, but not be limited to, position detection modules, haptic feedback modules, tensile elements, vibrational elements, thermal elements, communication modules, power source, various sensors, transceivers and antennas. The aforementioned system, device, and processors are examples and other systems, devices, and processors may comprise the aforementioned memory storage and processing unit, consistent with embodiments of the disclosure.

With reference to FIG. 9, a system consistent with an embodiment of the disclosure may include a computing device, such as controller 1500. In a basic configuration, controller 1500 may include at least one processing unit 1502 and a system memory 1504. Depending on the configuration and type of computing device, system memory 1504 may comprise, but is not limited to, volatile (e.g. random access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling controller 1500's operation. In one embodiment, programming modules 1506 may include controller firmware or application ("app") 1520. Furthermore, embodiments of the disclosure may be practiced in conjunction with a graphics library, other operating systems, or any other application program and is not limited to any particular application or system. This basic configuration is illustrated in FIG. 9 by those components within a dashed line 1508.

Controller 1500 may have additional features or functionality. For example, controller 1500 may also include additional data storage devices (removable and/or non-removable) such as, for example, magnetic disks, optical disks, or tape. Such additional storage is illustrated in FIG. 9 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by controller 1500. Any such computer storage media may be part of device 1500. Controller 1500 may also be operative with input device(s) 1512 such as a keyboard, a mouse, a pen, a sound input device, a touch input device, etc. Input device(s) 1512 may be used to, for example, manually access and program controller 1500. Output device(s) 1514 such as a headset, display, speakers, a printer, etc. may also be included. The aforementioned devices are examples and others may be used.

Controller 1500 may also contain a communication connection 1516 that may allow device 1500 to communicate with VR devices and other computing devices 1522 as well as haptic interface device components 1518 (e.g., position detection modules, haptic feedback modules, tensile elements, vibrational elements, thermal elements, communication modules, power source, various sensors, transceivers and antennas), such as over an encrypted network in a distributed computing environment. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, Bluetooth, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., device controller application 1520) may perform processes including, for example, one or more of stages or portions of stages of method 1400 as described above. App 1520 may be configured to operate device components 1518 and receive instructions from, for example, communications connections module 1516. The aforementioned process is an example, and processing unit 1502 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In accordance with the present disclosure, the invention includes at least the following aspects:

Aspect 1: An interface device for a user, the device comprising: at least one position detection module configured to determine positional data for determining a position of at least one portion of at least one body part of the user; and at least one tensile element coupled to the at least one body part and configured to produce positional data associated with the at least one coupled body part; the at least one tensile element in operative communication with the at least one positional detection.

Aspect 2: The device of any preceding aspect, further comprising at least one haptic feedback module configured to produce force feedback to the at least one body part, the feedback module comprising: at least one motion control module configured to control a range of motion of the at least one body part; and at least one force sensor configured to determine applied force data generated from the at least one body part.

Aspect 3: The device of any preceding aspect, wherein the at least one tensile element is in operative communication with at least one of: the at least one positional detection and the at least one motor control module.

Aspect 4: The device of any preceding aspect, wherein the force feedback produced is based on at least one of: the applied force data and the positional data.

Aspect 5: A haptic interface device for a user, the device comprising: at least one position detection module configured to determine positional data for determining a position of at least one portion of at least one body part of the user; at least one tensile element coupled to the at least one body part and configured to produce at least one of: a predetermined range of motion and applied force to a coupled body part; and at least one haptic feedback module configured to produce force feedback to the at least one body part, the feedback module comprising: at least one motion control module configured to control a range of motion of the at least one body part; and at least one force sensor configured to determine applied force data generated from the at least one body part; wherein the at least one tensile element is in operative communication with at least one of: the at least one positional detection and the at least one motor control module; wherein the force feedback produced is based on at least one of: the applied force data and the positional data.

Aspect 6: The device of any preceding aspect, wherein the device comprises a plurality of tensile elements.

Aspect 7: The device of any preceding aspect, wherein the device comprises a plurality of position detection modules.

Aspect 8: The device of any preceding aspect, wherein the position detection module comprises at least one position sensor.

Aspect 9: The device of any preceding aspect, wherein the position detection module comprises a plurality of position sensors.

Aspect 10: The device of any preceding aspect, wherein the at least one position detection module is configured to determine positional data based at least on a linear displacement of the tensile element.

Aspect 11: The device of any preceding aspect, wherein the position detection module is configured to determine positional data based at least on measuring tensile element stroke length caused by at least one of: movement of the at least one body part and articulation of the at least one body part.

Aspect 12: The device of any preceding aspect, wherein the position detection module is configured to measure at least one of: linear motion data and rotational motion data.

Aspect 13: The device of any preceding aspect, wherein the position detection module is configured to spool or wind a portion of the tensile element.

Aspect 14: The device of any preceding aspect, wherein the position detection module comprises at least one cylinder element on which at least a portion of the tensile element can be wound and unwound.

Aspect 15: The device of any preceding aspect, wherein the position detection module is configured to determine positional data based at least on rotational motion data generated by a cylinder element.

Aspect 16: The device of any preceding aspect, wherein the cylinder element comprises at least one of a flanged cylinder, unflanged cylinder, drum, spool, wheel, reel, spindle, bobbin, pulley, shaft, and spinner.

Aspect 17: The device of any preceding aspect, wherein the position sensor is configured to measure rotational motion data from the cylinder element for a plurality of axes.

Aspect 18: The device of any preceding aspect, wherein the position detection module is configured to determine linear displacement of the tensile element based at least on the rotational motion data and cylinder element dimensions.

Aspect 19: The device of any preceding aspect, wherein determining linear displacement of the tensile element comprises mapping rotational data to a linear distance based on cylinder dimensions.

Aspect 20: The device of any preceding aspect, wherein the position sensor comprises at least one of: an optical encoder, hall effect sensor, magnetic encoder, current sensor, potentiometer, optical encoder, digital encoder, motor encoder, magnetic encoder, inertial measurement unit (IMU), flex sensor, and stretch sensor.

Aspect 21: The device of any preceding aspect, wherein at least one position sensor is at least one of a hall-effect sensor and 3-axis hall effect sensor. Combine with 17.

Aspect 22: The device of any preceding aspect, wherein the position detection module comprises a first position sensor and a second position sensor.

Aspect 23: The device of any preceding aspect, wherein the position detection module comprises a first position sensor configured to produce positional data for a first body part portion and a second position sensor configured to produce positional data for a second area of the user's body.

Aspect 24: The device of any preceding aspect, wherein the device comprises at least one position sensor configured to produce positional data associated with at least one of lateral movement and vertical movement.

Aspect 25: The device of any preceding aspect, wherein at least one position sensor is configured to produce positional data associated with at least one of: side to side (e.g., lateral) angle data and up and down (e.g., vertical) angle data from movement the user's body part.

Aspect 26: The device of any preceding aspect, further comprising a retraction mechanism in operable communication with the tensile element.

Aspect 27: The device of any preceding aspect, wherein the retraction mechanism is configured to maintain a predetermined tension level in the tensile element.

Aspect 28: The device of any preceding aspect, wherein the retraction mechanism is configured to return the tensile element to a default position in the absence of an applied force acting on the tensile element.

Aspect 29: The device of any preceding aspect, wherein the retraction mechanism comprises at least one of a torsion spring, extension spring, constant force spring, retraction spring, power spring, elastic retractor, pulley system, compression spring, and motor.

Aspect 30: The device of any preceding aspect, wherein the tension level is at least about 1 lb./force.

Aspect 31: The device of any preceding aspect, wherein the tension level is in a range from greater than 0 to about 100 lb./force.

Aspect 32: The device of any preceding aspect, wherein the tension level is sufficient to create the sensation of touch on the user's body part.

Aspect 33: The device of any preceding aspect, wherein the tensile element further comprises at least one tensile element connector.

Aspect 34: The device of any preceding aspect, wherein the tensile element is connected to another device component using a tensile element connector or connecting means.

Aspect 35: The device of any preceding aspect, wherein the retraction mechanism is configured to at least one of: return the tensile element to a default or start position in the absence of an applied force and return the position detection module to a starting configuration in the absence of an applied force.

Aspect 36: The device of any preceding aspect, wherein the tensile element comprises at least one of a string, springs, mechanical linkages, and variable resistance springs.

Aspect 37: The device of any preceding aspect, wherein the tensile element is configured to transmit an applied force to coupled portion of the user's body part.

Aspect 38: The device of any preceding aspect, wherein the tensile element is configured to transmit or carry the tension to a portion of the finger to create the sensation of touch on the finger.

Aspect 39: The device of any preceding aspect, wherein the tensile element is configured to carry the tension to at least one finger segment to create the sensation of touch on the finger.

Aspect 40: The device of any preceding aspect, wherein the plurality of tensile elements are configured to carry the tension to a plurality of finger segments to create the sensation of touch on the finger.

Aspect 41: The device of any preceding aspect, wherein the device comprises first and second tensile elements.

Aspect 42: The device of any preceding aspect, wherein the device comprises first and second tensile elements for each user finger.

Aspect 43: The device of any preceding aspect, wherein the device comprises first and second tensile elements, the first tensile element being configured to couple to a first portion of the user's body and the second tensile element being configured to couple to a second portion of the user's body.

Aspect 44: The device of any preceding aspect, wherein the device comprises first and second tensile elements, the first tensile element being configured to couple to a first segment of the user's finger and the second tensile element being configured to couple to a second segment of the same finger.

Aspect 45: The device of any preceding aspect, wherein the device comprises first and second tensile elements, the first tensile element being configured to couple to a distal segment of the user's finger and the second tensile element being configured to couple to a proximal segment of the same finger.

Aspect 46: The device of any preceding aspect, further comprising a third element configured to couple to a third portion of the user's body part.

Aspect 47: The device of any preceding aspect, further comprising a third tensile element configured to couple to a third segment of the same finger.

Aspect 48: The device of any preceding aspect, further comprising a third tensile element configured to couple to a middle segment of the same finger.

Aspect 49: The device of any preceding aspect, wherein the first tensile element comprises at least a 2:1 step up ratio for increasing total travel length of the first tensile element relative to a stop position, and wherein the second tensile element comprises a 1:1 travel length relative to the same stop position.

Aspect 50: The device of any preceding aspect, where tensile element connector is configured to provide a travel adjustment in the tensile element.

Aspect 51: The device of any preceding aspect, wherein the travel reduction is at least about 2:1.

Aspect 52: The device of any preceding aspect, wherein the tensile element connector is configured to allow the tensile element to be pulled twice as far as a relative tensile element.

Aspect 53: The device of any preceding aspect, wherein the tensile element connector comprises at least one of: a groove, anchor, pulley, and bead.

Aspect 54: The device of any preceding aspect, wherein the device is further configured to derive secondary positional data and positional models based at least on at least one of: linear displacement from at least one of a plurality of tensile elements and linear length from at least one of a plurality of tensile elements.

Aspect 55: The device of any preceding aspect, wherein the device is further configured to generate secondary positional data and positional models based at least on at least one of: linear displacement from the first and second tensile elements and linear length from the first and second tensile elements.

Aspect 56: The device of any preceding aspect, wherein generating secondary positional data and positional models is based at least on at least one of: relative tensile element lengths, derived relationships between known positional data, and derived relationships between measured positional data.

Aspect 57: The device of any preceding aspect, wherein generating secondary positional data and positional models is based at least on at least one of: relative tensile element lengths and derived relationships between positional data from the first and second position sensors.

Aspect 58: The device of any preceding aspect, wherein the motion control module comprises at least one motion position sensor.

Aspect 59: The device of any preceding aspect, wherein the motion position sensor comprises at least one of: an optical encoder, magnetic encoder, current sensor, potentiometer, optical encoder, digital encoder, motor encoder, magnetic encoder, inertial measurement unit (IMU), flex sensor, stretch sensor, or a combination thereof.

Aspect 60: The device of any preceding aspect, wherein at least one motion position sensor is a potentiometer.

Aspect 61: The device of any preceding aspect, wherein at least one motion position sensor is a motor encoder.

Aspect 62: The device of any preceding aspect, wherein the motion control module comprises a stopping mechanism configured to provide a stop position for the tensile element.

Aspect 63: The device of any preceding aspect, wherein the stopping mechanism comprises at least one channel configured to allow the tensile element to travel through.

Aspect 64: The device of any preceding aspect, wherein the stopping mechanism comprises a plurality of channels configured to allow different tensile elements to travel through.

Aspect 65: The device of any preceding aspect, wherein the channel comprises at least one of an opening, aperture, and tubing.

Aspect 66: The device of any preceding aspect, wherein the stopping mechanism is configured to control movement of the at least one body part movement.

Aspect 67: The device of any preceding aspect, wherein the stopping mechanism is configured to stop forward travel of the tensile element by preventing a tensile element connector connected to a portion of the tensile element from passing through the stopping mechanism channel.

Aspect 68: The device of any preceding aspect, wherein the stopping mechanism comprises at least one of a motion limiting component, stop block, lead nut, dampener, and brake.

Aspect 69: The device of any preceding aspect, wherein the stop position comprises a forward travel limit for the tensile element. Combine with 59.

Aspect 70: The device of any preceding aspect, wherein a travel distance between the default position and stop position defines a range of motion of the coupled body part.

Aspect 71: The device of any preceding aspect, wherein the motion control module comprises at least one power transmission component.

Aspect 72: The device of any preceding aspect, wherein the power transmission component comprises at least one of: a motor, belt and pulley, linear actuator, screw drive, rotational motor with linkage, rack and pinion, pneumatic, electromagnetic, hydraulic, and combustion.

Aspect 73: The device of any preceding aspect, wherein the power transmission component is configured to move the motion limiting component to a stop position.

Aspect 74: The device of any preceding aspect, wherein the motion control module comprises a motor, drive screw, motion limiting component, motor encoder; and force sensing module.

Aspect 75: The device of any preceding aspect, wherein the motion limiting component is attached to the drive screw.

Aspect 76: The device of any preceding aspect, wherein the motion position sensor is configured to generate positional data of the stop position for the stopping mechanism.

Aspect 77: The device of any preceding aspect, wherein the stopping mechanism connected to the screw drive is configured to limit the forward motion for the tensile elements.

Aspect 78: The device of any preceding aspect, wherein a stopping force of the stopping mechanism is based on intrinsic or physical properties of the device components.

Aspect 79: The device of any preceding aspect, wherein a stopping force of the stopping mechanism is not determined by strength of the power transmission component or a motor.

Aspect 80: The device of any preceding aspect, wherein the power transmission component or a motor does not provide any force or torque to the stopping mechanism to limit travel of a tensile element.

Aspect 81: The device of any preceding aspect, wherein the power transmission component or motor is not back drivable.

Aspect 82: The device of any preceding aspect, wherein the stopping force is at least about 1 lb.

Aspect 83: The device of any preceding aspect, wherein the plurality of tensile elements are constrained in forward motion by the same stopping mechanism.

Aspect 84: The device of any preceding aspect, wherein exit points for the plurality of tensile elements can be configured to create a force vector dependent on the type of user interaction.

Aspect 85: The device of any preceding aspect, wherein the exit points are configured to produce a force vector and a relative displacement change in the length of each of the two tensile elements.

Aspect 86: The device of any preceding aspect, wherein the exit points are configured to allow use of a single stop block for a plurality of strings and further configured to distribute the force based on which finger segment is contacting the virtual object first.

Aspect 87: The device of any preceding aspect, wherein the force sensor is configured to measure a force the user is applying to the device.

Aspect 88: The device of any preceding aspect, wherein the force sensor is configured to measure the force the user is applying to the device to control the stop position to simulate dynamic virtual objects.

Aspect 89: The device of any preceding aspect, wherein the force sensor comprises at least one of: a pressure sensor, strain gauge, stretch sensor, current sensor on motor, and force gauge.

Aspect 90: The device of any preceding aspect, wherein motion position sensor is configured to determine the linear travel distance of the stopping mechanism based on the number of measured revolutions of the lead screw and the lead screw dimensions.

Aspect 91: The device of any preceding aspect, wherein the motor is configured to turn the drive screw backwards, which can pull backwards on the user's finger.

Aspect 92: The device of any preceding aspect, wherein when the user relaxes their finger, a torsion spring returns the tensile element to the default position.

Aspect 93: The device of any preceding aspect, wherein the force sensor is connected to the lead screw.

Aspect 94: The device of any preceding aspect, wherein when the stopping mechanism is engaged, the lead screw is pressed against the force sensing module based on the total force applied from the plurality of tensile elements.

Aspect 95: The device of any preceding aspect, wherein device is configured to determine the total force applied by a plurality of contact points.

Aspect 96: The device of any preceding aspect, wherein a stronger force allows the stop block to move forward based on the material properties of a virtual object.

Aspect 97: The device of any preceding aspect, further comprising a limit switch for use as a zeroing location.

Aspect 98: The device of any preceding aspect, wherein the limit switch is used to create a zero position for at least one of: a position sensor and motion position sensor during a calibration procedure.

Aspect 99: The device of any preceding aspect, wherein the limit switch is located at the front of the assembly.

Aspect 100: The device of any preceding aspect, further comprising at least one support structure configured to support one or more device components.

Aspect 101: The device of any preceding aspect, wherein the support structure comprises a garment, enclosure, anchor, connector, housing, casing, shell, or exoskeleton.

Aspect 102: The device of any preceding aspect, wherein the device comprises a plurality of support structures.

Aspect 103: The device of any preceding aspect, further comprising at least one support structure sized and shaped to removably couple to the user or user's body part.

Aspect 104: The device of any preceding aspect, further comprising at least one enclosure for housing one or more device components.

Aspect 105: The device of any preceding aspect, wherein the enclosure is configured to guide the tensile element from the position detection module out to the user.

Aspect 106: The device of any preceding aspect, wherein one or more device component comprises channels configured to guide the tensile element.

Aspect 107: The device of any preceding aspect, wherein the support structure comprises a tensile element guide comprising at least one channel configured to guide the tensile element.

Aspect 108: The device of any preceding aspect, wherein the support structure comprises a garment configured to allow the tensile element to be woven in or physically incorporated into the garment.

Aspect 109: The device of any preceding aspect, wherein the channel comprises at least one of an opening, aperture, and tubing.

Aspect 110: The device of any preceding aspect, wherein the channel is configured to guide the tensile element over the top of the coupled user area or user's body part.

Aspect 111: The device of any preceding aspect, wherein the channel is configured to guide the tensile element over a top surface of a coupled finger to a fingertip without being felt by the user. Use with exit points.

Aspect 112: The device of any preceding aspect, further comprising a strap for releasably securing the device to a palm of a user.

Aspect 113: The device of any preceding aspect, wherein the strap is configured to apply a force to the palm of a user's hand.

Aspect 114: The device of any preceding aspect, wherein the support structure comprises a garment sized and shaped to removably couple to a portion of a hand.

Aspect 115: The device of any preceding aspect, wherein the garment comprises a finger portion sized and shaped to removably couple to a portion of at least one finger.

Aspect 116: The device of any preceding aspect, wherein the garment comprises a plurality of finger portions configured to couple to at least one of a first finger segment, a middle finger segment, or a fingertip.

Aspect 117: The device of any preceding aspect, wherein the garment comprises an article of clothing.

Aspect 118: The device of any preceding aspect, wherein the article of clothing comprises at least one of a glove, sleeve, legging, pants, shirt, and body suit.

Aspect 119: The device of any preceding aspect, wherein the device comprises a plurality of support structures configured to couple to a proximal finger segment and a distal finger segment.

Aspect 120: The device of any preceding aspect, wherein the plurality of support structures are movably connected by a connecting means.

Aspect 121: The device of any preceding aspect, wherein the connecting means is configured to enable relative movement between connected support structures.

Aspect 122: The device of any preceding aspect, wherein relative movement can comprise pivoting or bending or the like.

Aspect 123: The device of any preceding aspect, wherein the finger comprises at least one of an index finger, middle finger, ring finger, a little finger, and thumb, and combinations thereof.

Aspect 124: The device of any preceding aspect, wherein the support structure comprises a hard material or soft material, or combinations thereof.

Aspect 125: The device of any preceding aspect, wherein the support structure comprises a woven material or fabric, a non-woven fabric, or the like.

Aspect 126: The device of any preceding aspect, wherein the support structure comprises a rigid, thermoplastic material, or the like.

Aspect 127: The device of any preceding aspect, wherein a portion of the support structure comprises a woven material and a rigid, thermoplastic material.

Aspect 128: The device of any preceding aspect, wherein the tensile element is connected to a finger segment support structure.

Aspect 129: The device of any preceding aspect, wherein the finger segment support structure comprises a pad or band.

Aspect 130: The device of any preceding aspect, wherein the tensile element is coupled to a finger segment using the finger segment support structure.

Aspect 131: The device of any preceding aspect, wherein the finger segment support structure pulls on the tensile element when the user moves their finger forward.

Aspect 132: The device of any preceding aspect, wherein the tensile element is utilized to provide positional data and force feedback.

Aspect 133: The device of any preceding aspect, further comprising a plurality of position detection modules configured to capture motion of a plurality of finger joints.

Aspect 134: The device of any preceding aspect, comprising a plurality of tensile elements connected to different parts of finger configured to create alternative force sensations.

Aspect 135: The device of any preceding aspect, wherein the device is configured to provide variable force profiles or variable sensation profiles, or combination thereof.

Aspect 136: The device of any preceding aspect, wherein the device is configured to simultaneously provide a plurality of variable force profiles or a plurality of variable sensation profiles, or combinations thereof.

Aspect 137: The device of any preceding aspect, wherein the device is configured to simultaneously deliver a first variable force profile to a user's finger and deliver a second variable force profile to a different user finger.

Aspect 138: The device of any preceding aspect, wherein the device is configured to provide different variable force profiles or different variable sensation profiles at any rate or at any time interval.

Aspect 139: The device of any preceding aspect further comprising a microcontroller in operative communication with at least one of the position detection module and haptic feedback system.
Aspect 140: The device of any preceding aspect, further comprising at least one wireless module.
Aspect 141: The device of any preceding aspect, wherein the wireless module comprises a wireless transmitter or wireless receiver or a combination thereof.
Aspect 142: The device of any preceding aspect, wherein the wireless module is configured to send and receive data from the sensors and motors on the glove to the computer.
Aspect 143: The device of any preceding aspect, further comprising a power source configured to provide power one or more device components.
Aspect 144: The device of any preceding aspect, further comprising a securing means configured to releasably secure the device to a user or user's body part.
Aspect 145: The device of any preceding aspect, wherein the securing means comprising a palm strap configured to releasably secure the device to the back of a user's hand.
Aspect 146: The device of any preceding aspect, further comprising at least one peripheral mount configured to detachably connect at least one peripheral computing component or accessory.
Aspect 147: The device of any preceding aspect, wherein the peripheral computing component or accessory can comprise a tracking device, such as, for example, tracking devices that are operable with VR, AR, or computing systems.
Aspect 148: The device of any preceding aspect, wherein the user comprises a mammal.
Aspect 149: The device of any preceding aspect, wherein the mammal comprises a human.
Aspect 150: The device of any preceding aspect, wherein the user's body part comprises a limb, extremity, finger, fingertip, arm, hand, leg, foot, knee, or appendage, or combinations thereof.
Aspect 151: The device of any preceding aspect, further comprising at least one of: at least one vibrational source configured to transmit vibration to the user's body part and at least one thermal elements configured to provide heat or cool to the user's body part.
Aspect 152: The device of any preceding aspect, further comprising at least one air chamber configured to produce a gap between a surface of the user's body and one or more device components.
Aspect 153: The device of any preceding aspect, wherein the air chamber is configured to maintain a constant contact pressure on a surface of the user's body.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An interface device for a user, the device comprising:
   at least one position detection module configured to determine positional data for determining a position of at least one portion of at least one body part of the user;
   at least one tensile element coupled with the at least one body part and configured to produce positional data associated with the at least one coupled body part; and
   at least one motor control module configured to control a range of motion of the at least one body part for producing force feedback using the at least one tensile element; wherein the at least one tensile element is configured to generate force feedback to the coupled portion of the user's body part at least by controlling a range of motion of said coupled body part, thereby producing the force feedback; and wherein the force feedback produced is at least based on the positional data.

2. The device of claim 1, further comprising at least one force sensor configured to determine applied force data generated from the at least one coupled body part.

3. The device of claim 2, wherein the force feedback produced is based on the applied force data and the positional data.

4. The device of claim 3, wherein the at least one force sensor is configured to measure a force the user is applying to the device to control a forward travel distance limit for the at least one tensile element.

5. The device of claim 1, wherein the at least one tensile element is in mechanical communication with the at least one motor control module.

6. The device of claim 1, wherein the position detection module is configured to determine positional data based at least on measuring tensile element stroke length caused by movement of the at least one coupled body part.

7. The device of claim 6, wherein the position detection module comprises at least one of: an optical encoder, hall effect sensor, magnetic encoder, current sensor, potentiometer, digital encoder, motor encoder, magnetic encoder, inertial measurement unit (IMU), flex sensor, stretch sensor, and 3-axis hall effect sensor.

8. The device of claim 6, wherein the device comprises a first tensile element and a second tensile element, the first tensile element being configured to couple to a first portion of the user's body part and the second tensile element being configured to couple to a second portion of the user's same body part.

9. The device of claim 8, wherein the first tensile element comprises at least a 2:1 step up ratio for increasing total travel length of the first tensile element relative to a stop position, and wherein the second tensile element comprises a 1:1 travel length relative to the stop position.

10. The device of claim 1, wherein the at least one motor control module comprises a stopping mechanism configured to provide a stop position for the at least one tensile element.

11. The device of claim 10, wherein the stop position comprises a forward travel distance limit for the at least one tensile element; and wherein a travel distance between a default position and the stop position defines a range of motion of the coupled body part.

12. The device of claim 11, wherein the stopping mechanism is connected to a screw drive configured to limit forward motion for the at least one tensile element; and wherein the screw drive is further configured to move the stopping mechanism and the at least one tensile element back to provide dynamic force feedback.

13. The device of claim 11, wherein a stopping force of the stopping mechanism is not determined by strength of a motor; and wherein a motor does not provide any force or torque to the stopping mechanism to limit travel of a tensile element when stopped.

14. The device of claim 13, further comprising one or more exit points configured to allow use of a single stopping mechanism for a plurality of tensile elements; and wherein the device is further configured to distribute the force based on which segment of the body part is contacting a virtual object first.

15. The device of claim 11, further comprising at least one force sensor configured to determine applied force data generated from the at least one coupled body part; and wherein the force feedback produced is based on the applied force data and the positional data.

16. The device of claim 1, wherein the at least one position detection module is configured to produce positional data associated with at least one of: lateral angle data or vertical angle data from movement a user's body part.

17. A haptic interface device for a user's hand, the device comprising:
   a glove configured to be worn by the user;
   at least one tensile element coupled to at least one body part of the user and configured to produce at least one of: a predetermined range of motion for controlling said at least one coupled body part or a force applied to said at least one coupled body part;
   at least one position detection module configured to determine positional data for determining a position of at least one portion of said at least one coupled body part of the user based at least in part on tensile element stroke length; and
   at least one haptic feedback module configured to produce force feedback to the at least one body part, the at least one haptic feedback module comprising:
      at least one motion control module configured to control a range of motion of the at least one body part, and
      at least one force sensor configured to determine applied force data generated from the at least one body part;
   wherein the force feedback produced by the at least one haptic feedback module is based on at least one of: the applied force data generated by the at least one force sensor or the positional data generated by the position detection module.

18. The device of claim 17, wherein the at least one motion control module comprises a stopping mechanism configured to provide a stop position for the at least one tensile element.

19. The device of claim 18, wherein the stop position comprises a forward travel distance limit for the at least one tensile element; and wherein a travel distance between a default position and the stop position defines a range of motion of the at least one coupled body part.

20. The device of claim 17, wherein the at least one position detection module is configured to produce positional data associated with at least one of: lateral angle data or vertical angle data from movement a user's body part.

21. The device of claim 17, wherein the force feedback produced is based on the applied force data and the positional data.

* * * * *